United States Patent
Lee et al.

(10) Patent No.: US 12,250,256 B2
(45) Date of Patent: Mar. 11, 2025

(54) TIME SENSITIVE COMMUNICATION ASSISTANCE INFORMATION FOR EXTENDED REALITY DATA TRAFFIC

(71) Applicant: QUALCOMM Incorporated, San Diego, CA (US)

(72) Inventors: Hyun Yong Lee, San Diego, CA (US); Ravi Agarwal, San Diego, CA (US); Mickael Mondet, Louannec (FR); Peerapol Tinnakornsrisuphap, San Diego, CA (US); Prashanth Haridas Hande, San Diego, CA (US); Sebastian Speicher, Wallisellen (CH); Dario Serafino Tonesi, San Diego, CA (US); Miguel Griot, La Jolla, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/656,335

(22) Filed: Mar. 24, 2022

(65) Prior Publication Data

US 2023/0308496 A1 Sep. 28, 2023

(51) Int. Cl.
*H04L 65/612* (2022.01)
*H04L 43/087* (2022.01)

(52) U.S. Cl.
CPC .......... *H04L 65/612* (2022.05); *H04L 43/087* (2013.01)

(58) Field of Classification Search
CPC ............................ H04L 65/612; H04L 43/087
USPC ......................................................... 709/219
See application file for complete search history.

(56) References Cited

U.S. PATENT DOCUMENTS

| | | | |
|---|---|---|---|
| 2015/0365450 A1* | 12/2015 | Gaunt | H04L 65/65 709/231 |
| 2020/0267084 A1* | 8/2020 | Hande | H04L 47/283 |
| 2020/0351804 A1* | 11/2020 | Moon | H04W 76/25 |
| 2021/0282049 A1* | 9/2021 | Sun | H04W 28/24 |
| 2022/0264490 A1* | 8/2022 | Sha | H04W 56/001 |
| 2022/0338142 A1* | 10/2022 | Minokuchi | H04J 3/12 |
| 2022/0417972 A1* | 12/2022 | Rossbach | H04W 72/1278 |

FOREIGN PATENT DOCUMENTS

| | | | |
|---|---|---|---|
| WO | WO-2022028716 A1 * | 2/2022 | |
| WO | WO-2022242881 A1 * | 11/2022 | H04L 47/24 |

\* cited by examiner

*Primary Examiner* — Tan Doan
(74) *Attorney, Agent, or Firm* — Harrity & Harrity, LLP

(57) ABSTRACT

Various aspects of the present disclosure generally relate to wireless communication. In some aspects, a network node may receive time sensitive communication assistance information (TSCAI), associated with extended reality data traffic, that comprises at least one of multimedia cadence information, timing update information, timing offset information, configurable parameter set information, or extended reality specific traffic pattern information. The network node may transmit feedback associated with the TSCAI. Numerous other aspects are described.

30 Claims, 14 Drawing Sheets

TIME SENSITIVE COMMUNICATION ASSISTANCE INFORMATION FOR EXTENDED REALITY DATA TRAFFIC

FIELD OF THE DISCLOSURE

Aspects of the present disclosure generally relate to wireless communication and to techniques and apparatuses for time sensitive communication assistance information for extended reality data traffic.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a network node. The method may include receiving time sensitive communication assistance information (TSCAI), associated with extended reality data traffic, that comprises at least one of multimedia cadence information, timing update information, timing offset information, configurable parameter set information, or extended reality specific traffic pattern information. The method may include transmitting feedback associated with the TSCAI.

Some aspects described herein relate to a method of wireless communication performed by a network node. The method may include transmitting a modification request for TSCAI associated with extended reality data traffic. The method may include receiving feedback associated with the modification request for the TSCAI.

Some aspects described herein relate to an apparatus for wireless communication performed by a network node. The apparatus may include a memory and one or more processors, coupled to the memory. The one or more processors may be configured to receive TSCAI, associated with extended reality data traffic, that comprises at least one of multimedia cadence information, timing update information, timing offset information, configurable parameter set information, or extended reality specific traffic pattern information. The one or more processors may be configured to transmit feedback associated with the TSCAI.

Some aspects described herein relate to an apparatus for wireless communication performed by a network node. The apparatus may include a memory and one or more processors, coupled to the memory. The one or more processors may be configured to transmit a modification request for TSCAI associated with extended reality data traffic. The one or more processors may be configured to receive feedback associated with the modification request for the TSCAI.

Some aspects described herein relate to a non-transitory computer-readable medium that stores a set of instructions for wireless communication by a network node. The set of instructions, when executed by one or more processors of the network node, may cause the network node to receive TSCAI, associated with extended reality data traffic, that comprises at least one of multimedia cadence information, timing update information, timing offset information, configurable parameter set information, or extended reality specific traffic pattern information. The set of instructions, when executed by one or more processors of the network node, may cause the network node to transmit feedback associated with the TSCAI.

Some aspects described herein relate to a non-transitory computer-readable medium that stores a set of instructions for wireless communication by a network node. The set of instructions, when executed by one or more processors of the network node, may cause the network node to transmit a modification request for TSCAI associated with extended reality data traffic. The set of instructions, when executed by one or more processors of the network node, may cause the network node to receive feedback associated with the modification request for the TSCAI.

Some aspects described herein relate to an apparatus for wireless communication. The apparatus may include means for receiving TSCAI, associated with extended reality data traffic, that comprises at least one of multimedia cadence information, timing update information, timing offset information, configurable parameter set information, or extended reality specific traffic pattern information. The apparatus may include means for transmitting feedback associated with the TSCAI.

Some aspects described herein relate to an apparatus for wireless communication. The apparatus may include means for transmitting a modification request for TSCAI associated with extended reality data traffic. The apparatus may include means for receiving feedback associated with the modification request for the TSCAI.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
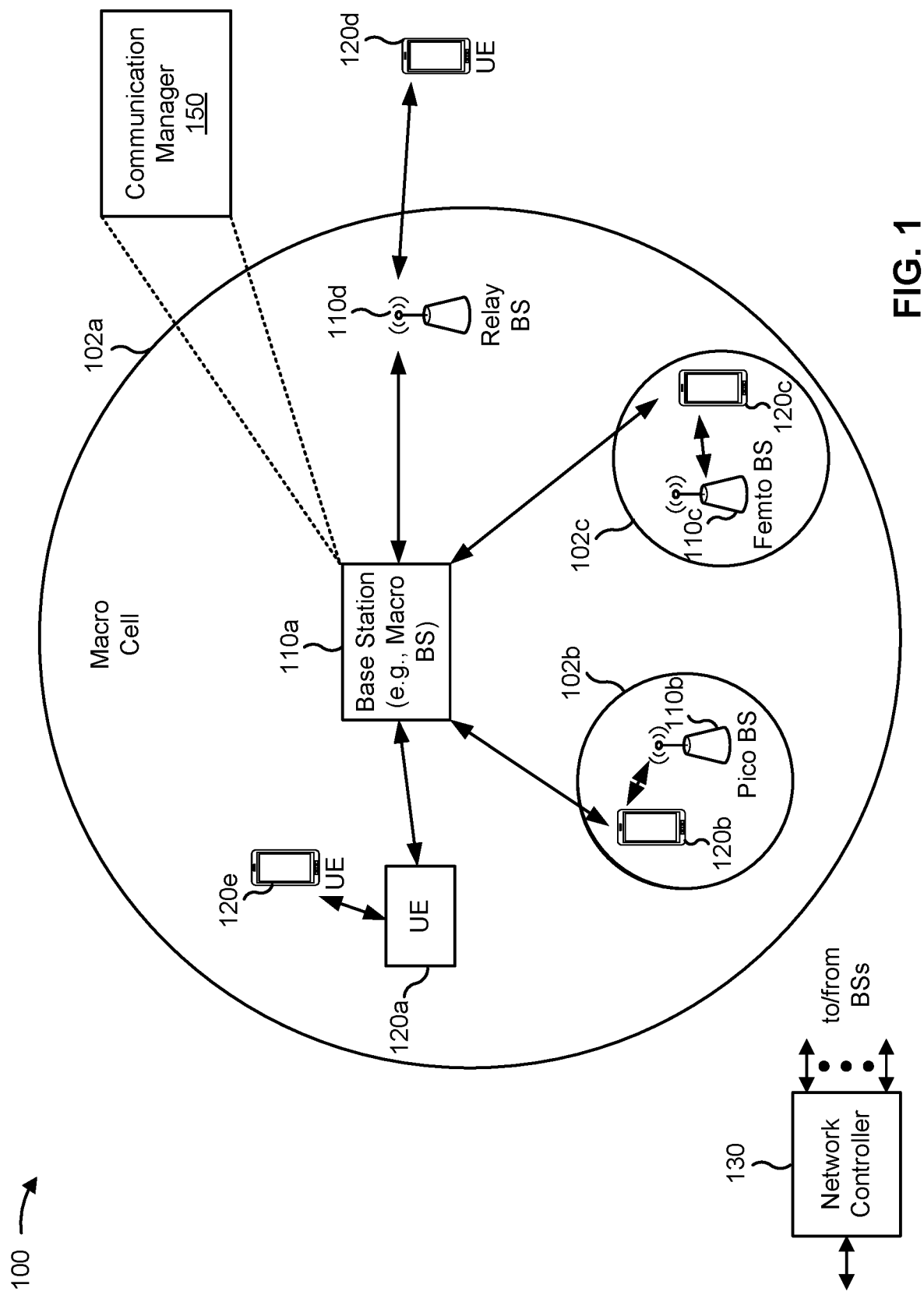
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the base station 110 may include a communication manager 150. As described in more detail elsewhere herein, the communication manager 150 may receive time sensitive communication assistance information (TSCAI), associated with extended reality data traffic, that comprises at least one of multimedia cadence information, timing update information, timing offset information, configurable parameter set information, or extended reality specific traffic pattern information; and transmit feedback associated with the TSCAI. Additionally, or alternatively, the communication manager 150 may perform one or more other operations described herein.

In some aspects, the communication manager 150 may transmit a modification request for TSCAI associated with extended reality data traffic; and receive feedback associated with the modification request for the TSCAI. Additionally, or alternatively, the communication manager 150 may perform one or more other operations described herein.

As indicated above, FIG. 1 is provided as an example. Other examples may differ from what is described with regard to FIG. 1.

Figure 2:
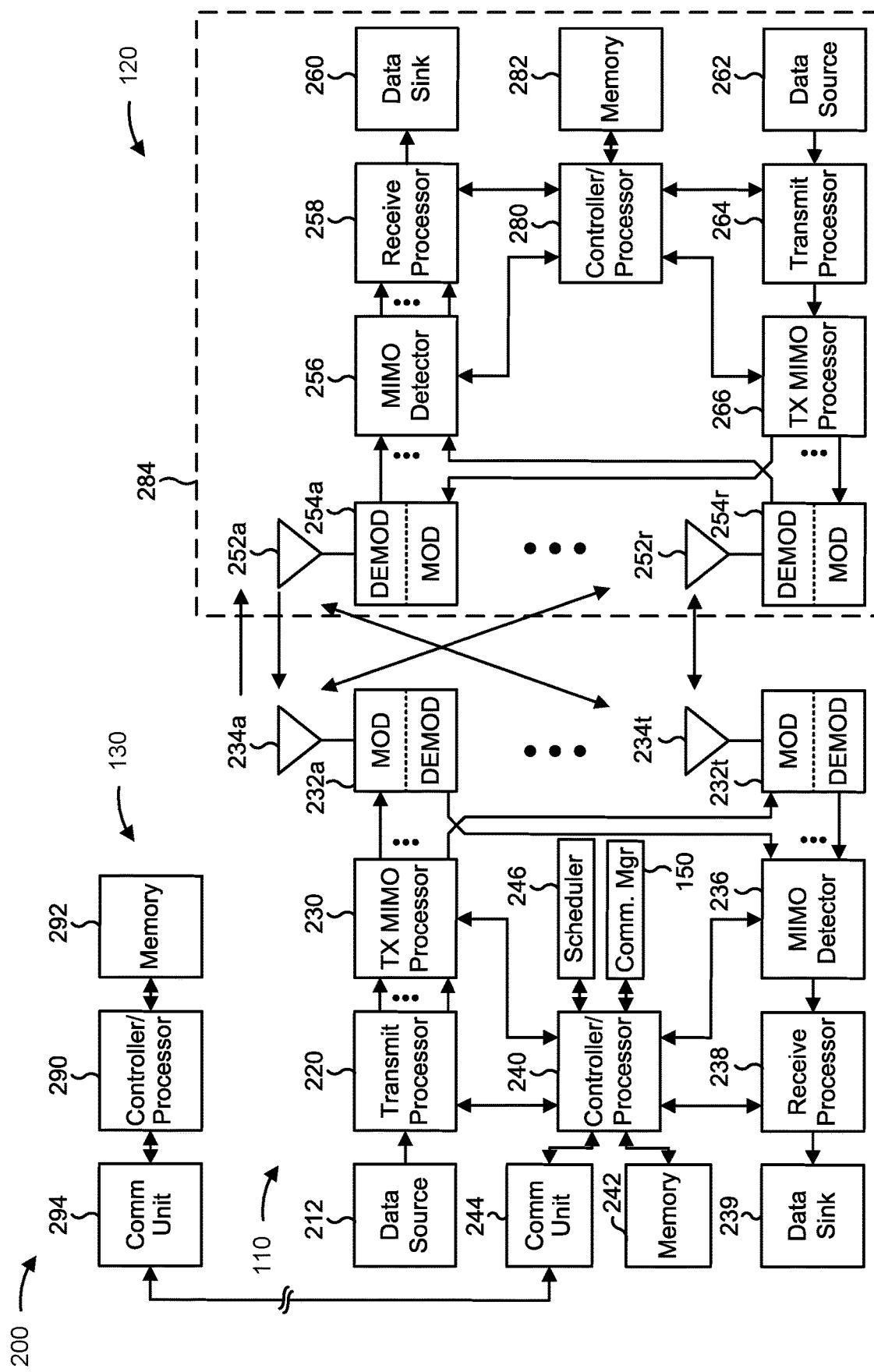
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 7-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 7-12).

The controller/processor 240 of the base station 110, the controller/processor 280 of the UE 120, and/or any other component(s) of FIG. 2 may perform one or more techniques associated with communicating TSCAI for extended reality (XR) data traffic, as described in more detail elsewhere herein. For example, the controller/processor 240 of the base station 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the base station 110 includes means for receiving TSCAI, associated with extended reality data traffic, that comprises at least one of multimedia cadence information, timing update information, timing offset information, configurable parameter set information, or extended reality specific traffic pattern information; and/or means for transmitting feedback associated with the TSCAI. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the base station 110 includes means for transmitting a modification request for TSCAI associated with extended reality data traffic; and/or means for receiving feedback associated with the modification request for the TSCAI. In some aspects, the means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
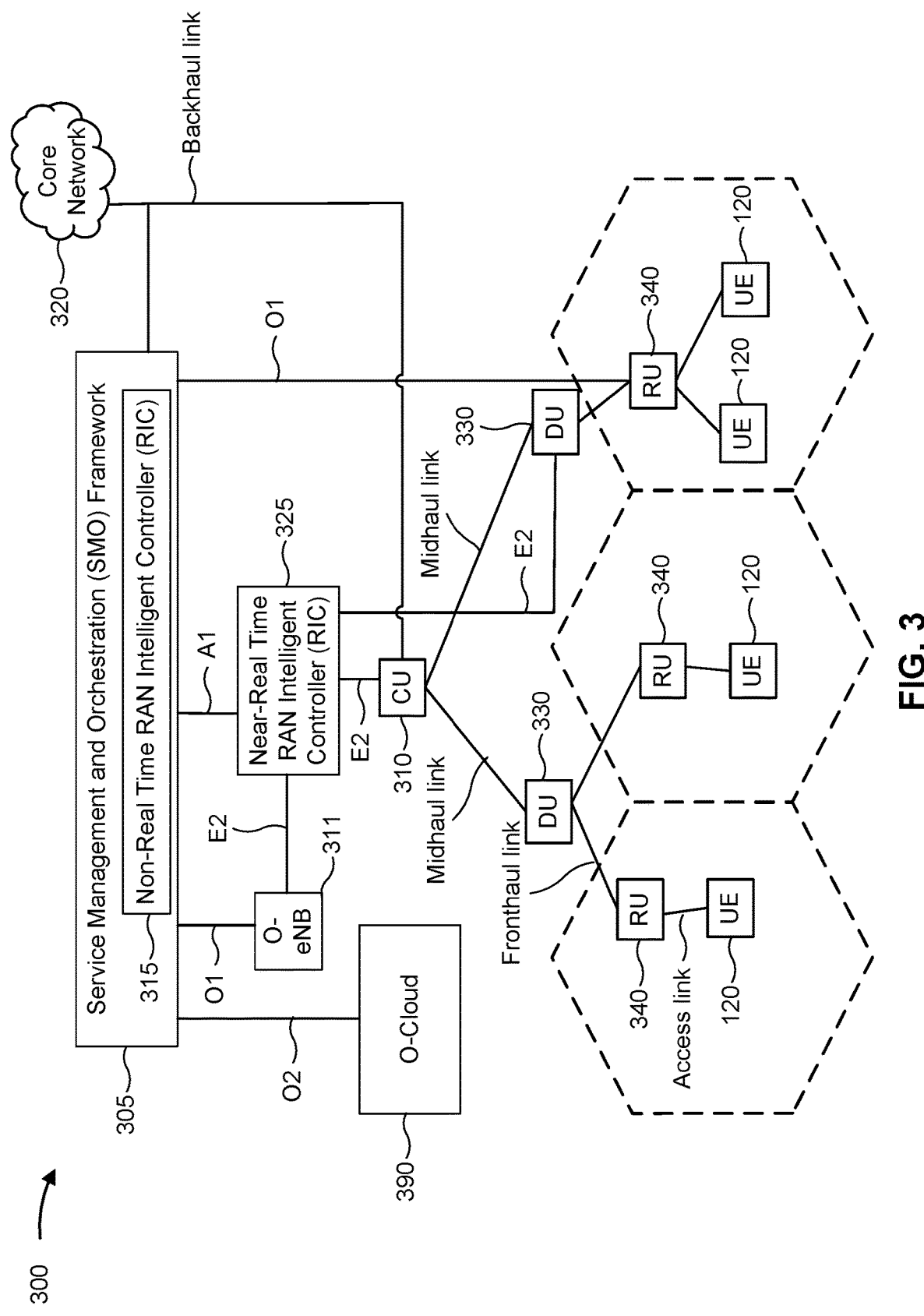
FIG. 3 is a diagram illustrating an example disaggregated base station architecture, in accordance with the present disclosure.

FIG. 3 is a diagram illustrating an example 300 disaggregated base station architecture, in accordance with the present disclosure.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station (BS, e.g., base station 110), or one or more units (or one or more components) performing base station functionality, may be implemented in an aggregated or disaggregated architecture. For example, a BS (such as a Node B (NB), eNB, NR BS, 5G NB, access point (AP), a TRP, a cell, or the like) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual centralized unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an O-RAN (such as the network configuration sponsored by the O-RAN Alliance), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

The disaggregated base station architecture shown in FIG. 3 may include one or more CUs 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more DUs 330 via respective midhaul links, such as an F1 interface. The DUs 330 may communicate with one or more RUs 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340), as well as the Near-RT RICs 325, the Non-RT RICs 315, and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 330 may further host one or more low-PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT MC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the non-RT RIC 315 or the Near-RT RIC 325 may be configured to tune RAN behavior or performance. For example, the non-RT RIC 315 may monitor long-term trends and patterns for performance and employ AI/ML models to perform corrective actions through the SMO Framework 305 (such as reconfiguration via O1) or via creation of RAN management policies (such as A1 policies).

As indicated above, FIG. 3 is provided as an example. Other examples may differ from what is described with regard to FIG. 3.

Figure 4:
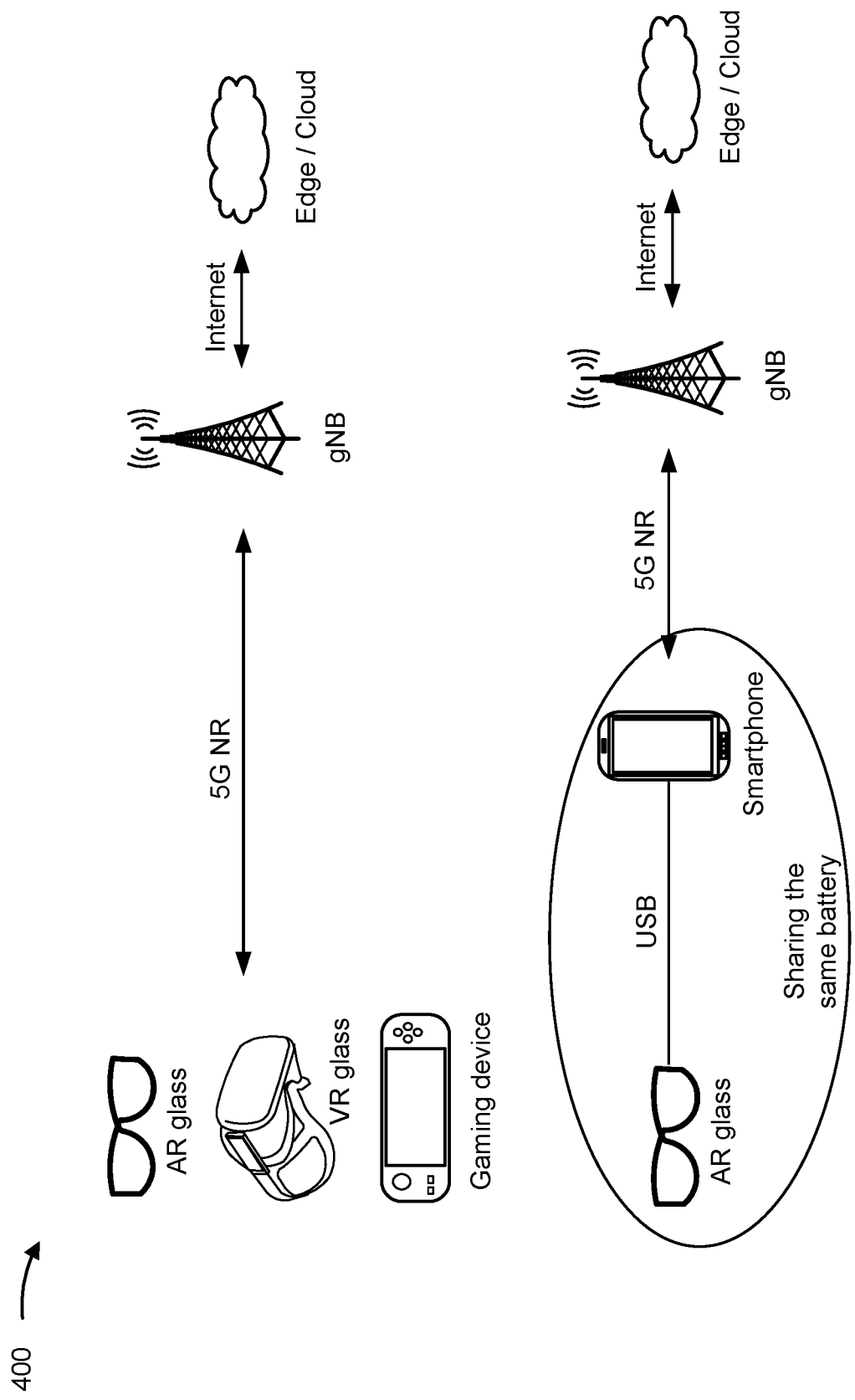
FIG. 4 is a diagram illustrating an example of devices configured for periodic multimedia traffic applications, in accordance with the present disclosure.

FIG. 4 is a diagram illustrating an example 400 of devices designed for periodic multimedia traffic applications, in accordance with the present disclosure.

Some devices, including devices for XR and/or gaming, may require low-latency traffic to and from an edge server or a cloud environment. The traffic to and from the edge server or the cloud environment may be periodic, to support a particular frame rate (e.g., 120 frames per second (FPS), 90 FPS, 60 FPS) and/or a particular refresh rate (e.g., 500 Hertz (Hz), 120 (Hz)) for multimedia traffic applications such as XR and/or gaming.

In some cases, the XR may include virtual reality (VR), augmented reality (AR), or mixed reality (MR), or among other examples. In some cases, VR may completely immerse a user in a computer-generated virtual environment. For example, the user may wear a headset that displays the virtual environment and that blocks out (or partially blocks out) the real-world environment. In some cases, AR may overlay computer generated objects onto the real-world environment. For example, the user may view an image of the real-world environment through a cell phone (via a camera and display), and the cell phone may display computer-generated objects in the image of the real-world environment. In some cases, MR may be any combination of VR or AR that mixes the virtual environment (or virtual objects) with the real-world environment (or real-world objects).

Example 400 shows communications between an XR device and the edge server or the cloud environment, via a base station (e.g., a gNB, a base station 110, and/or another type of network entity described in connection with FIG. 3). The XR device may be an AR device, a VR device, an MR device, or other gaming device. XR devices may have limited battery capacity while being expected to have a battery life of a smartphone (e.g., full day of use). Battery power is an issue even when the XR device is tethered to a smartphone and uses the same smartphone battery. XR device power dissipation may be limited and may lead to an uncomfortable user experience and/or a short battery life.

An XR device may include a UE 120 or may be associated with a UE 120. Multimedia traffic applications for an XR device (or for another type of gaming device such as a UE 120) may include a video game (e.g., where multimedia traffic is transferred to and from an edge server or a cloud environment at a particular frame rate to support audio and/or video rendering) and/or a VR environment (e.g., where multimedia traffic is transferred to and from an edge server or a cloud environment at a particular polling rate to support sensor (e.g., 6 degrees of freedom (6DOF) sensor input and feedback), among other examples.

As indicated above, FIG. 4 is provided as an example. Other examples may differ from what is described with regard to FIG. 4.

Figure 5A:
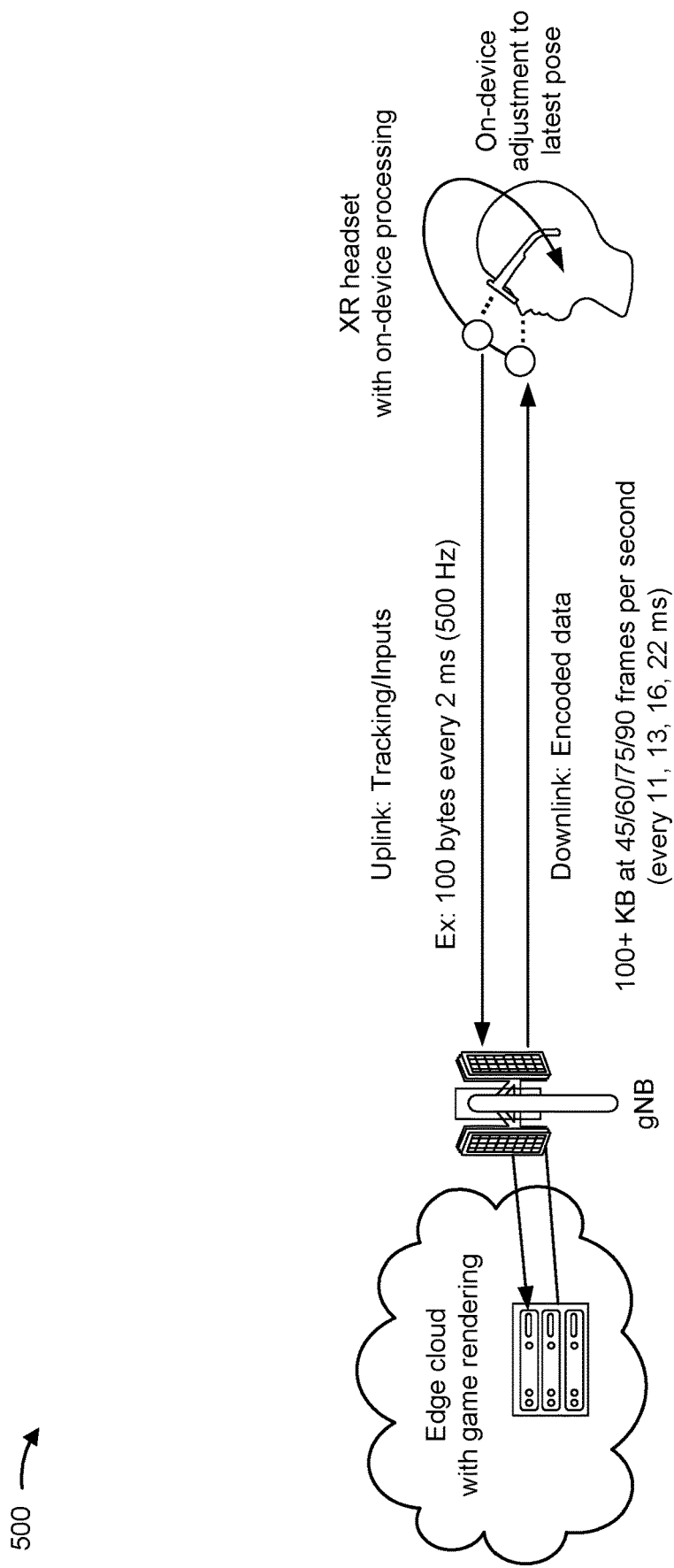
FIGS. 5A and 5B are diagrams illustrating examples of periodic multimedia traffic and associated scheduling techniques, in accordance with the present disclosure.
Figure 5B:
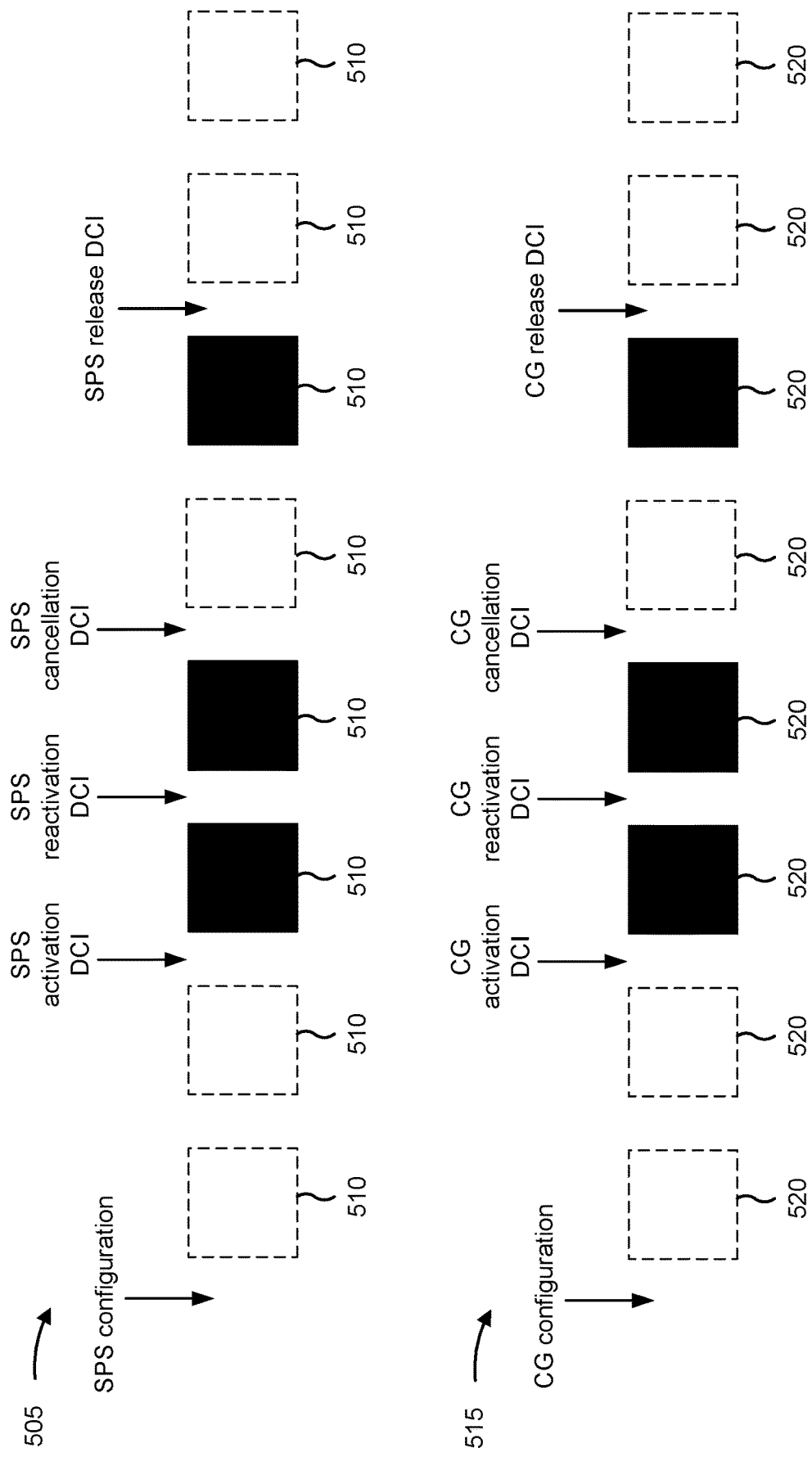

FIGS. 5A and 5B are diagrams illustrating examples of periodic multimedia traffic and associated scheduling techniques, in accordance with the present disclosure.

Turning to FIG. 5A, in an example 500, power dissipation may be reduced by limiting an amount of time that processing resources of the XR device are active for computations and power consumption. Some wireless communications systems may a support a UE 120, such as the XR device, that operates based at least in part on periodic multimedia traffic, as described above in connection with FIG. 4.

By offloading some computations to an edge server, an XR device may conserve processing resources. Moreover, this may enable an XR device to provide graphic fidelity (e.g., texture detail, anti-aliasing, ray tracing) that might not otherwise be achievable using the memory and processing resources of the XR device to perform video rendering, as the video rendering may performed by the edge server (which typically has more powerful memory and processing resources).

Example 500 shows a scenario where an XR device may split computations for an application with the edge server on the other side of a base station (e.g., a base station 110 and/or another type of network entity described above in connection with FIG. 3). The edge server may render video frames, such as intra-coded (I) frames and predicted (P) frames, encode the video frames, align the video frames with user pose information, and perform other related computations. However, this means there may be more traffic between the XR device and the edge server, which will cause the XR device to consume more power and signaling resources.

Periodic multimedia traffic for an XR device (or another type of UE 120 or gaming device) may include downlink traffic (e.g., video frames) that has a periodic pattern corresponding to a frame rate of transmitted video data (e.g., H.264/H.265 encoded video). Such downlink traffic may be quasi-periodic with a data burst every frame at one frame-per-second (1/fps), or two possibly staggered "eye-buffers" per frame at 1/(2*fps). For example, downlink traffic for an XR device may include 100+kilobytes (kB) of data for 45, 60, 75, or 90 frames per second (e.g., every 11 milliseconds (ms), 13 ms, 16 ms, or 22 ms). Periodic multimedia traffic for an XR device (or another type of UE 120 or gaming device) may also include uplink traffic that is periodic. For example, controller information for gaming, information for VR split rendering, and/or the user pose information may be polled (e.g., by an associated UE 120, by an edge cloud) at a particular rate (e.g., 500 Hz, 1000 Hz) to determine input updates (which may correspond to movement or actions in a video game or movement of a VR headset, for example). The uplink traffic may include 100 bytes every 2 ms (500 Hz), for example. However, other examples are within the scope of the present disclosure.

FIG. 5B is a diagram illustrating an example 505 of downlink semi-persistent scheduling (SPS) communication and an example 515 of uplink configured grant (CG) communication, in accordance with the present disclosure. CG communication and SPS communication may be implemented in a wireless network (e.g., the wireless network 100) to support periodic multimedia traffic described herein for XR use cases, gaming use cases, and/or other types of use cases.

SPS communications may include periodic downlink communications that are configured for a UE (e.g., a UE 120, an XR device, a gaming device), such that a network entity (e.g., a base station 110, a CU 310, a DU 330, an RU 340) does not need to send separate downlink control information (DCI) to schedule each downlink communication, thereby conserving signaling overhead. CG communications may include periodic uplink communications that are configured for a UE, such that a network entity does not need to send separate DCI to schedule each uplink communication, thereby conserving signaling overhead and reducing latency.

As shown in the example 505, a UE may be configured with an SPS configuration for SPS communications. For example, the UE may receive the SPS configuration via a radio resource control (RRC) communication transmitted by a network entity. The SPS configuration may indicate a resource allocation associated with SPS downlink communications (e.g., in a time domain, frequency domain, spatial domain, and/or code domain) and a periodicity at which the resource allocation is repeated, resulting in periodically reoccurring scheduled SPS occasions 510 for the UE. The SPS configuration may also configure hybrid automatic repeat request (HARQ)-acknowledgement (ACK) (HARQ-ACK) feedback resources for the UE to transmit HARQ-ACK feedback for SPS physical downlink shared channel (PDSCH) communications received in the SPS occasions 510. For example, the SPS configuration may indicate a PDSCH-to-HARQ feedback timing value, which may be referred to as a K1 value in a wireless communication standard (e.g., a 3GPP standard).

The network entity may transmit SPS activation DCI to the UE to activate the SPS configuration for the UE. The network entity may indicate, in the SPS activation DCI, communication parameters, such as an MCS, a resource block (RB) allocation, and/or antenna ports, for the SPS PDSCH communications to be transmitted in the scheduled SPS occasions 510. The UE may begin monitoring the SPS occasions 510 based at least in part on receiving the SPS activation DCI. For example, beginning with a next scheduled SPS occasion 510 subsequent to receiving the SPS activation DCI, the UE may monitor the scheduled SPS occasions 510 to decode PDSCH communications using the communication parameters indicated in the SPS activation DCI. The UE may refrain from monitoring configured SPS occasions 510 prior to receiving the SPS activation DCI.

The network entity may transmit SPS reactivation DCI to the UE to change the communication parameters for the SPS PDSCH communications. Based at least in part on receiving the SPS reactivation DCI, the UE may begin monitoring the scheduled SPS occasions 510 using the communication parameters indicated in the SPS reactivation DCI. For example, beginning with a next scheduled SPS occasion 510 subsequent to receiving the SPS reactivation DCI, the UE may monitor the scheduled SPS occasions 510 to decode PDSCH communications based on the communication parameters indicated in the SPS reactivation DCI.

In some cases, such as when the network entity does not have downlink traffic to transmit to the UE, the network entity may transmit SPS cancellation DCI to the UE to temporarily cancel or deactivate one or more subsequent SPS occasions 510 for the UE. The SPS cancellation DCI may deactivate only a subsequent one SPS occasion 510 or a subsequent N SPS occasions 510 (where N is an integer). SPS occasions 510 after the one or more (e.g., N) SPS occasions 510 subsequent to the SPS cancellation DCI may remain activated. Based at least in part on receiving the SPS cancellation DCI, the UE may refrain from monitoring the one or more (e.g., N) SPS occasions 510 subsequent to receiving the SPS cancellation DCI. As shown in example 505, the SPS cancellation DCI cancels one subsequent SPS occasion 510 for the UE. After the SPS occasion 510 (or N SPS occasions) subsequent to receiving the SPS cancellation DCI, the UE may automatically resume monitoring the scheduled SPS occasions 510.

The network entity may transmit SPS release DCI to the UE to deactivate the SPS configuration for the UE. The UE may stop monitoring the scheduled SPS occasions 510 based at least in part on receiving the SPS release DCI. For example, the UE may refrain from monitoring any scheduled SPS occasions 510 until another SPS activation DCI is received from the network entity. Whereas the SPS cancellation DCI may deactivate only a subsequent one SPS occasion 510 or a subsequent N SPS occasions 510, the SPS release DCI deactivates all subsequent SPS occasions 510 for a given SPS configuration for the UE until the given SPS configuration is activated again by a new SPS activation DCI.

As shown in example 515, a UE may be configured with a CG configuration for CG communications. For example, the UE may receive the CG configuration via an RRC communication transmitted by a network entity. The CG configuration may indicate a resource allocation associated with CG uplink communications (e.g., in a time domain, frequency domain, spatial domain, and/or code domain) and a periodicity at which the resource allocation is repeated, resulting in periodically reoccurring scheduled CG occasions 520 for the UE. In some examples, the CG configuration may identify a resource pool or multiple resource pools that are available to the UE for an uplink transmission. The CG configuration may configure contention-free CG communications (e.g., where resources are dedicated for the UE to transmit uplink communications) or contention-based CG communications (e.g., where the UE contends for access to a channel in the configured resource allocation, such as by using a channel access procedure or a channel sensing procedure).

In some aspects, the RRC communication also functions as the activation for the CG configuration. This is referred to as Type 1 configured grant. In some aspects, the network entity may further transmit CG activation DCI to the UE to activate the CG configuration for the UE. This is referred to as Type 2 configured grant. The network entity may indicate, in the CG activation DCI, communication parameters, such as an MCS, an RB allocation, and/or antenna ports, for the CG physical uplink shared channel (PUSCH) communications to be transmitted in the scheduled CG occasions 520. The UE may begin transmitting in the CG occasions 520 based at least in part on receiving the CG activation DCI. For example, beginning with a next scheduled CG occasion 520 subsequent to receiving the CG activation DCI, the UE may transmit a PUSCH communication in the scheduled CG occasions 520 using the communication parameters indicated in the CG activation DCI. The UE may refrain from transmitting in configured CG occasions 520 prior to receiving the CG activation DCI.

The network entity may transmit CG reactivation DCI to the UE to change the communication parameters for the CG PUSCH communications. Based at least in part on receiving the CG reactivation DCI, and the UE may begin transmitting in the scheduled CG occasions 520 using the communication parameters indicated in the CG reactivation DCI. For example, beginning with a next scheduled CG occasion 520 subsequent to receiving the CG reactivation DCI, the UE may transmit PUSCH communications in the scheduled CG occasions 520 based at least in part on the communication parameters indicated in the CG reactivation DCI.

In some cases, such as when the network entity needs to override a scheduled CG communication for a higher priority communication, the network entity may transmit CG cancellation DCI to the UE to temporarily cancel or deactivate one or more subsequent CG occasions 520 for the UE. The CG cancellation DCI may deactivate only a subsequent one CG occasion 515 or a subsequent N CG occasions 520 (where N is an integer). CG occasions 520 after the one or more (e.g., N) CG occasions 520 subsequent to the CG cancellation DCI may remain activated. Based at least in part on receiving the CG cancellation DCI, the UE may refrain from transmitting in the one or more (e.g., N) CG occasions 520 subsequent to receiving the CG cancellation DCI. As shown in example 515, the CG cancellation DCI cancels one subsequent CG occasion 520 for the UE. After the CG occasion 520 (or N CG occasions) subsequent to receiving the CG cancellation DCI, the UE may automatically resume transmission in the scheduled CG occasions 520.

The network entity may transmit CG release DCI to the UE to deactivate the CG configuration for the UE. The UE may stop transmitting in the scheduled CG occasions 520 based at least in part on receiving the CG release DCI. For example, the UE may refrain from transmitting in any scheduled CG occasions 520 until another CG activation DCI is received from the network entity. Whereas the CG cancellation DCI may deactivate only a subsequent one CG occasion 515 or a subsequent N CG occasions 520, the CG release DCI deactivates all subsequent CG occasions 520 for a given CG configuration for the UE until the given CG configuration is activated again by a new CG activation DCI.

As indicated above, FIGS. 5A and 5B are provided as examples. Other examples may differ from what is described with regard to FIGS. 5A and 5B.

Figure 6:
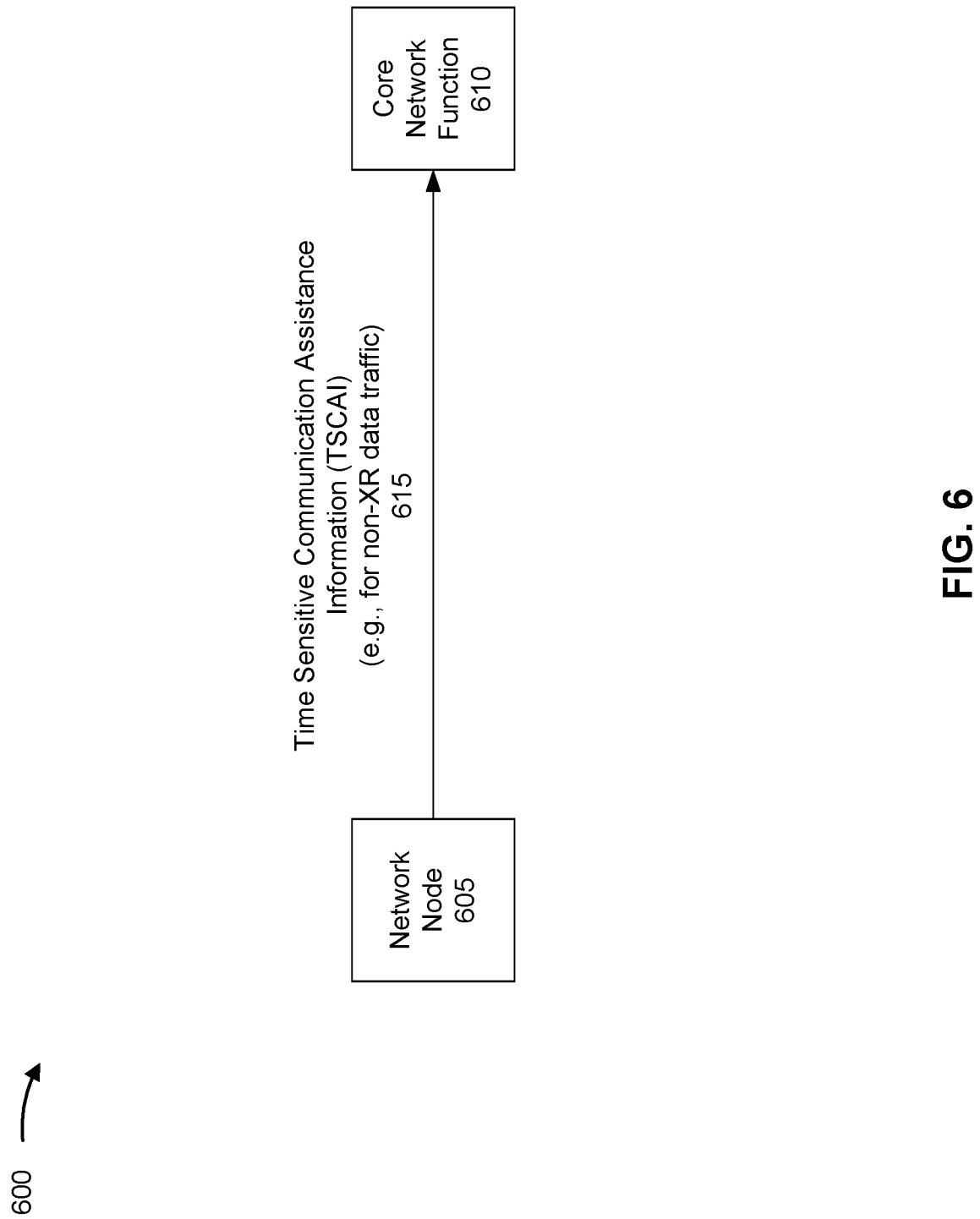
FIG. 6 is a diagram illustrating an example of communicating time sensitive communication assistance information (TSCAI) for non-extended-reality data traffic, in accordance with the present disclosure.

FIG. 6 is a diagram illustrating an example 600 of communicating TSCAI for non-XR data traffic. A network node, such as the network node 605, may communicate with a core network function, such as the core network function 610. The network node 605 may include some or all of the features of the base station 110, the CU 310, the DU 330, or the RU 340.

As shown in connection with reference number 615, the network node 605 may transmit, and the core network function 610 may receive, TSCAI. The TSCAI may include traffic pattern information such as flow direction information, periodicity information, or burst arrival time information. The flow direction information may indicate a direction of the time sensitive communication (TSC) flow (e.g., uplink or downlink). The periodicity information may indicate a time period between a start time of two different bursts of the XR data traffic. The burst arrival time information may indicate a latest possible time when a first packet of the data burst arrives at either the ingress interface of the network node 605 (e.g., for downlink) or the egress interface of the XR UE (e.g., for uplink).

In some cases, the TSCAI may be transmitted as follows: from an application function (AF) or a network exposure function (NEF) to a policy control function (PCF), from the PCF to a session management function (SMF), from the SMF to an access and mobility management function (AMF), and from the AMF to the network node 605. In some cases, the SMF may be responsible for mapping the burst arrival time and the periodicity from an external clock (if available) to a 5G clock based at least in part on the time offset and a cumulative rate ratio between the external clock time and the 5G clock time as measured and reported from a user plane function (UPF). In some aspects, "core network function 610" may refer to, or may include, any one or more of the above entities, such as the AF/NEF.

In some cases, XR data traffic may be bursty and periodic. For example, the XR data traffic may involve brief time periods with large amounts of data traffic followed by other time periods with smaller amounts of data traffic. In this case, the network node 605 may prepare the scheduling resources more efficiently (e.g., using UE staggering, discontinuous reception (DRX), or enhanced CG or SPS) if the traffic patterns of all XR users are obtained or determined in advance. In some cases, the TSCAI may enable the network node 605 to obtain or determine a traffic pattern for the data traffic in advance of the data traffic being communicated. However, the information being transmitted in the TSCAI for the non-XR data traffic, such as the flow direction information, periodicity information, and burst arrival time information, may not be compatible with the XR data traffic. For example, the TSCAI for the non-XR data traffic may not include one or more parameters that are necessary for the communication of XR data traffic.

In some cases, the network node 605 may be the best entity for deciding which XR data traffic pattern (e.g., UE staggering, data rate, or cadence, among other examples) can be served over the 5G communication link. However, there is currently no message that is configured to request an XR-specific traffic pattern between the network node 605 and the core network function 610 (e.g., the AF/NEF). For example, there is currently no message that is capable of requesting a modification to the XR data traffic pattern indicated in the TSCAI.

Techniques and apparatuses are described herein for communicating TSCAI for XR data traffic. In some aspects, the network node 605 may receive TSCAI associated with XR data traffic. The TSCAI may comprise at least one of multimedia cadence information, timing update information, timing offset information, configurable parameter set information, or extended reality specific traffic pattern information. The network node 605 may transmit feedback associated with the TSCAI. For example, the TSCAI may be received from the core network function 610, and the network node 605 may transmit the feedback to the core network function 610. In some aspects, the network node 605 may transmit a modification request for the TSCAI associated with the XR data traffic. For example, the network node 605 may transmit the modification request to the core network function 610. The core network function 610 may transmit feedback associated with the modification request for the TSCAI.

As described above, the information currently being transmitted in the TSCAI, such as the flow direction information, periodicity information, and burst arrival time information, may not be compatible with the XR data traffic. Similarly, there is currently no message that is capable of requesting a modification to the XR data traffic pattern indicated in the TSCAI. Using the techniques and apparatuses described herein, the network node 605 may transmit TSCAI that includes information for XR data traffic. This may enable the network node 605 to request information associated with the XR data traffic in advance of the XR data being communicated, and to update radio resources for the data traffic accordingly.

In some aspects, the core network function 610 may transmit, and the network node 605 may receive, information associated with the XR data traffic (e.g., periodicity and traffic size, among other examples). The information may include TSCAI. Using the TSCAI, the core network function 610 may indicate XR-specific traffic pattern information such as multimedia cadence information, timing update information, timing offset information, configurable parameter set information, or XR-specific traffic pattern information.

In some aspects, based at least in part on the TSCAI messages of one or more XR devices, the network node 605 may determine an appropriate XR data traffic pattern.

In some aspects, the network node 605 may request the appropriate XR data traffic pattern from the core network function 610. The request may be included in a TSCAI modification request. The request may include burst arrival time information, data rate information, and/or cadence information.

In some aspects, the core network function 610 may transmit the updated XR data traffic pattern to the network node 605. The updated XR data traffic pattern may be indicated in the TSCAI. In some aspects, the core network function 610 may update the optimal timings of multiple XR data traffic flows at once. In some aspects, the core network function 610 may indicate that audio and video packets should be shifted by the same amount for synchronization. Additionally, or alternatively, the core network function 610 may indicate that optimal uplink pose traffic timing may be related to downlink rendering traffic timing. In some aspects, the core network function 610 may indicate a timing update of the XR data traffic between the network node 605 and core network function 610 for time synchronization. Otherwise, user experience may be degraded. For example, the core network function 610 may explicitly indicate the update timing (e.g., after a certain number of XR data traffic bursts, or at a certain application data unit (ADU) index) when the XR data traffic is updated.

In some aspects, the RAN may update the radio resources based at least in part on the updated TSCAI. In some aspects, the network node 605 may update the resource configurations in time based at least in part on the update timing. For example, the network node 605 may update enhanced connected mode DRX (CDRX) or enhanced CG or SPS configurations.

Additional details regarding these features are described below in connection with FIGS. 7 and 8.

As indicated above, FIG. 6 is provided as an example. Other examples may differ from what is described with regard to FIG. 6.

Figure 7:
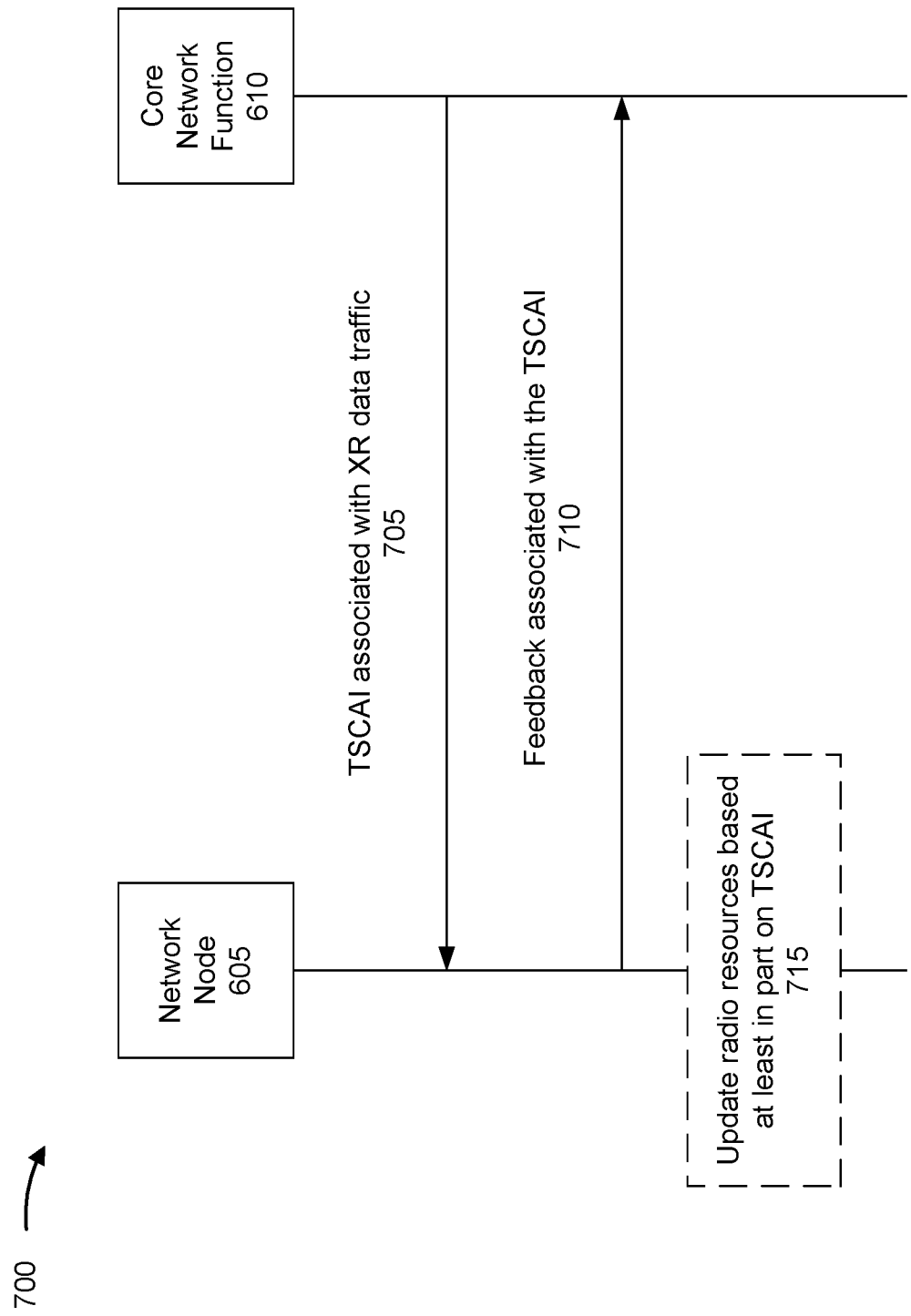
FIG. 7 is a diagram illustrating an example associated with communicating TSCAI for extended reality (XR) data traffic, in accordance with the present disclosure.

FIG. 7 is a diagram illustrating an example 700 of communicating TSCAI for XR data traffic, in accordance with the present disclosure.

As shown in connection with reference number 705, the core network function 610 may transmit, and the network node 605 may receive, TSCAI associated with XR data traffic. The TSCAI associated with the XR data traffic may include multimedia cadence information, timing update information, timing offset information, configurable parameter set information, or extended reality specific traffic pattern information, among other examples.

In some aspects, the periodicity of the TSCAI for the non-XR data traffic (measured in microseconds) may not be able to be aligned with the multimedia cadence and drift for the XR data traffic. In some aspects, the slot resource may not be matched at the network node 605 after the XR data traffic drifts are accumulated. For example, sixty frames per second (60 fps) XR data traffic with downlink or uplink alignment may have a periodicity of 16,6667 microseconds (compared with the 60 fps XR data traffic). Each burst of traffic may cause a one-third (⅓) microsecond drift. Thus, one slot drift may occur every 25 seconds (e.g., (0.5 ms/(⅓) μs) * (1/60) s=25 s).

In some aspects, the TSCAI for the XR data traffic may indicate a multimedia cadence of the burst traffic. In some examples, the TSCAI may indicate the multimedia cadence (measured in fps or Hz) as opposed to the periodicity (measured in ms). Additionally, or alternatively, the TSCAI may indicate an additional periodicity that is expressed as a rational number. For example, the TSCAI may indicate the additional periodicity in the form of a fractional periodicity having a periodicity numerator and a periodicity denominator. In some aspects, the TSCAI that indicates the multimedia cadence for the burst traffic may be used for the RRC configurations of a DRX cycle for enhanced DRX, or for the periodicity of an enhanced CG or SPS configuration. In some aspects, the TSCAI that indicates the multimedia cadence may be expressed as shown in Table 1.

TABLE 1

| Multimedia cadence (Hz) | Rational number for multimedia periodicity (ms) Integer part + fractional part |
|---|---|
| 24 | 41 + ⅔ |
| 30 | 33 + ⅓ |
| 45 | 22 + 2/9 |
| 48 | 20 + ⅚ |
| 60 | 16 + ⅔ |

TABLE 1-continued

| Multimedia cadence (Hz) | Rational number for multimedia periodicity (ms) Integer part + fractional part |
|---|---|
| 80 | 12 + ½ |
| 90 | 11 + ⅑ |
| 120 | 8 + ⅓ |

In some aspects, the TSCAI may indicate a nominal burst arrival time. Using the TSCAI for the non-XR data traffic, the current burst arrival time may be an absolute time, which may require strict time synchronization. In some cases, a relative time shift may adjust the burst arrival time even without strict time synchronization. However, the TSCAI for the non-XR data traffic may not cover the timing alignment across XR data traffic flows since there is no common reference timing.

In some aspects, the TSCAI may indicate an absolute time for the XR data traffic session. The absolute time may be expressed using a day, second, millisecond, or nanosecond, among other examples. In some aspects, the TSCAI may indicate a relative time shift compared to another XR data traffic session. The relative time shift may be expressed using milliseconds or nanoseconds. In some aspects, the TSCAI may indicate a relative timing offset for an XR data traffic flow compared to another XR data traffic flow. In this case, some XR data traffic flows may be aligned by having specific offsets to other XR data traffic data flows. For example, audio and video packets may be shifted by the same amount for synchronization. Additionally, or alternatively, the optimal uplink pose traffic timing may be related to the downlink rendering traffic timing. The relative timing offset may be expressed using milliseconds or nanoseconds.

In some aspects, the TSCAI may indicate an offset timing association. In this case, there may be multiple XR data traffic flows, and the traffic timings of some XR data traffic flows may be aligned by having certain offsets to other XR data traffic flows. The core network function 610 may indicate, to the network node 605, which flows are associated together with certain offsets. For example, the network node 605 may take all of the XR data traffic flows into account while calculating an appropriate traffic staggering. In a relative shift scenario, if one of flows is shifted, the other flows may also be shifted by the same amount at the same time. In some aspects, the TSCAI may indicate a set of XR data traffic flows which have a certain timing offset compared to the other XR data traffic flows in the set of XR data traffic flows. For example, the TSCAI may indicate a set of associated XR data traffic flows and the relative offsets. The TSCAI may indicate a flow identifier (e.g., a protocol data unit (PDU) session identifier or a quality of service (QoS) flow identifier, among other examples) and/or a unit (e.g., milliseconds or nanoseconds).

Additional details regarding the relative offset time and the offset timing association are described in connection with FIGS. 9A and 9B.

In some aspects, the TSCAI that indicates the nominal arrival time for the burst traffic may be used for the RRC configurations of a DRX offset for enhanced DRX, or for the time domain offset of an enhanced CG or SPS configuration.

In some aspects, the clock sources of the server and the 5G system may not be synchronized to each other. In this case, the core network function may update the nominal burst arrival time to the network node when the server and the network node is drafted more than a specific threshold. The core network function may update the nominal burst arrival time with the absolute time or the relative timing offset compared to the previous indication. From the update message, the network node may shift the resource timings including the DRX offset, and the time domain offset of the SPS or CG. In some aspects, the TSCAI may indicate a jitter of the burst arrival time. The arrival timing of XR burst traffic may not be consistent, and may have a jitter due to the rendering time at the core network function 610. The network node 605 may be able to prepare the resources in a better way if the network node 605 can obtain or determine the amount of jitter in advance of the XR data traffic communication. In some aspects, the TSCAI may indicate the jitter expressed in milliseconds or nanoseconds (e.g., tens of nanoseconds). In some aspects, the TSCAI may indicate a variance in the jitter, a maximum amount of jitter, a minimum amount of jitter, or a jitter pattern (e.g., frame pattern IPPP), among other examples.

In some aspects, the TSCAI may indicate a nominal packet delay budget (PDB) requirement. In this case, the network node 605 may need to know the nominal PDB in the jitter traffic. The nominal PDB may be indicated in terms of milliseconds or nanoseconds (e.g., tens of nanoseconds).

In some aspects, the TSCAI may indicate an average burst traffic size. The network node 605 may need to estimate the required transmission time of each XR device. For UE staggering, the required transmission times should not be overlapped across the UEs. In some aspects, the network node 605 may estimate the transmission time according to the UE channel condition and/or the cell load. The average burst traffic size may be indicated in terms of kilobytes (kB), and the type may be indicated as average.

In some aspects, the TSCAI may indicate a variance of the burst traffic size. The network node 605 may take the variance of the burst traffic size into account for similar purposes as the average traffic size. The variance of the burst traffic size may be indicated in terms of kilobytes, and the type may be indicated as variance, variance maximum, variance minimum, or size pattern (e.g., frame pattern IPPP), among other examples.

In some aspects, the TSCAI may include an update timing indication. If the update timing of XR data traffic pattern is not matched between the core network function 610 and the network node 605, the XR user experience may be degraded during the mismatch period. For example, if a CDRX offset is not matched with a traffic arrival time, all packets may be buffered during the inactivity time and dropped off due to the PDB requirement. In some aspects, if the XR data traffic pattern (e.g., timing offset, periodicity, or size) is updated while being served, the update timing may be explicitly indicated to the network node 605. In some aspects, the TSCAI may indicate the update timing (e.g., after a certain number of XR burst traffics, or at a certain ADU index, among other examples) when the XR data traffic pattern is updated. Based at least in part on the update timing, the network node 605 may prepare the appropriate radio resources. For example, the network node 605 may update the radio resources after the last current burst traffic is served. In some aspects, the TSCAI may indicate when the traffic pattern will be updated. In some aspects, the update timing indication may indicate a number of XR burst traffics until the update (e.g., for relative timing) or an ADU index (e.g., for absolute timing).

In some aspects, the TSCAI may indicate a type of the XR data traffic. The core network function 610 may identify the type of traffic session as XR data traffic so the network node 605 can prepare the radio resource by utilizing the XR data traffic characteristics. The type of the XR data traffic may be indicated as the burst traffic type (e.g., XR or IoT, among other examples).

In some aspects, the TSCAI may indicate a configurable parameter set. The network node 605 may be able to adjust the XR data traffic pattern (including periodicity and burst traffic size) based at least in part on requesting the configurable parameter set from the core network function 610. For example, network node 605 may transmit a time sensitive communication (TSC) modification request. In some aspects, the core network function 610 may proactively provide a set of all of the configurable parameters so that the network node 605 can select and request one of the parameters from the core network function 610. In some aspects, the TSCAI may indicate the configurable parameter set of an XR data traffic session which the core network function 610 can generate. For example, the configurable parameter set may include a configurable set of enhanced periodicity={24 fps, 30 fps, 48 fps, 60 fps}. In another example, the configurable parameter set may include a configurable set of burst traffic size={75 kB, 100 kB, 150 kB, 300 kB}. In another example, the configurable parameter set may include a combination of the enhanced periodicity and the burst traffic size.

In some aspects, the TSCAI may include a confirmation request. The confirmation request may indicate to the network node 605 that feedback needs to be sent to the core network function 610. In some aspects, the confirmation request may indicate whether the feedback request is enabled or disabled. If the feedback request is enabled, the network node 605 may need to send the feedback to the core network function 610. Alternatively, if the feedback request is disabled, the network node 605 may not need to send the feedback to the core network function 610.

As shown in connection with reference number 710, the network node 605 may transmit, and the core network function 610 may receive, feedback associated with the TSCAI for the XR data traffic. After receiving the TSCAI for the XR data traffic, the network node 605 may send the feedback message to the core network function 610. If the TSCAI for the XR data traffic is acceptable, the network node 605 may report an acknowledge massage to the core network function 610. If the TSCAI for the XR data traffic is not acceptable, the network node 605 may report a failure massage to the core network function 610.

As shown in connection with reference number 715, the network node 605 may update one or more radio resources based at least in part on the TSCAI. For example, the network node 605 may update a CDRX pattern or a CG or SPS configuration based at least in part on the TSCAI.

In some aspects, the network node 605 may transmit, and the core network function 610 may receive, a modification request for TSCAI associated with the XR data traffic. Additional details regarding these features are described below in connection with FIG. 8.

While the information is described herein as being included in a TSCAI, the information may be included in other types of information not including the TSCAI. For example, the multimedia cadence information, timing update information, timing offset information, configurable parameter set information, and/or extended reality specific traffic pattern information may be associated with another type of information, such as another type of time sensitive communication information.

As described above, the information currently being transmitted in the TSCAI, such as the flow direction information, periodicity information, and burst arrival time information, may not be compatible with the XR data traffic. Using the techniques and apparatuses described herein, the network node 605 may transmit TSCAI that includes information for XR data traffic. This may enable the network node 605 to request information associated with the XR data traffic in advance of the XR data being communicated, and to update radio resources for the data traffic accordingly.

As indicated above, FIG. 7 is provided as an example. Other examples may differ from what is described with regard to FIG. 7.

Figure 8:
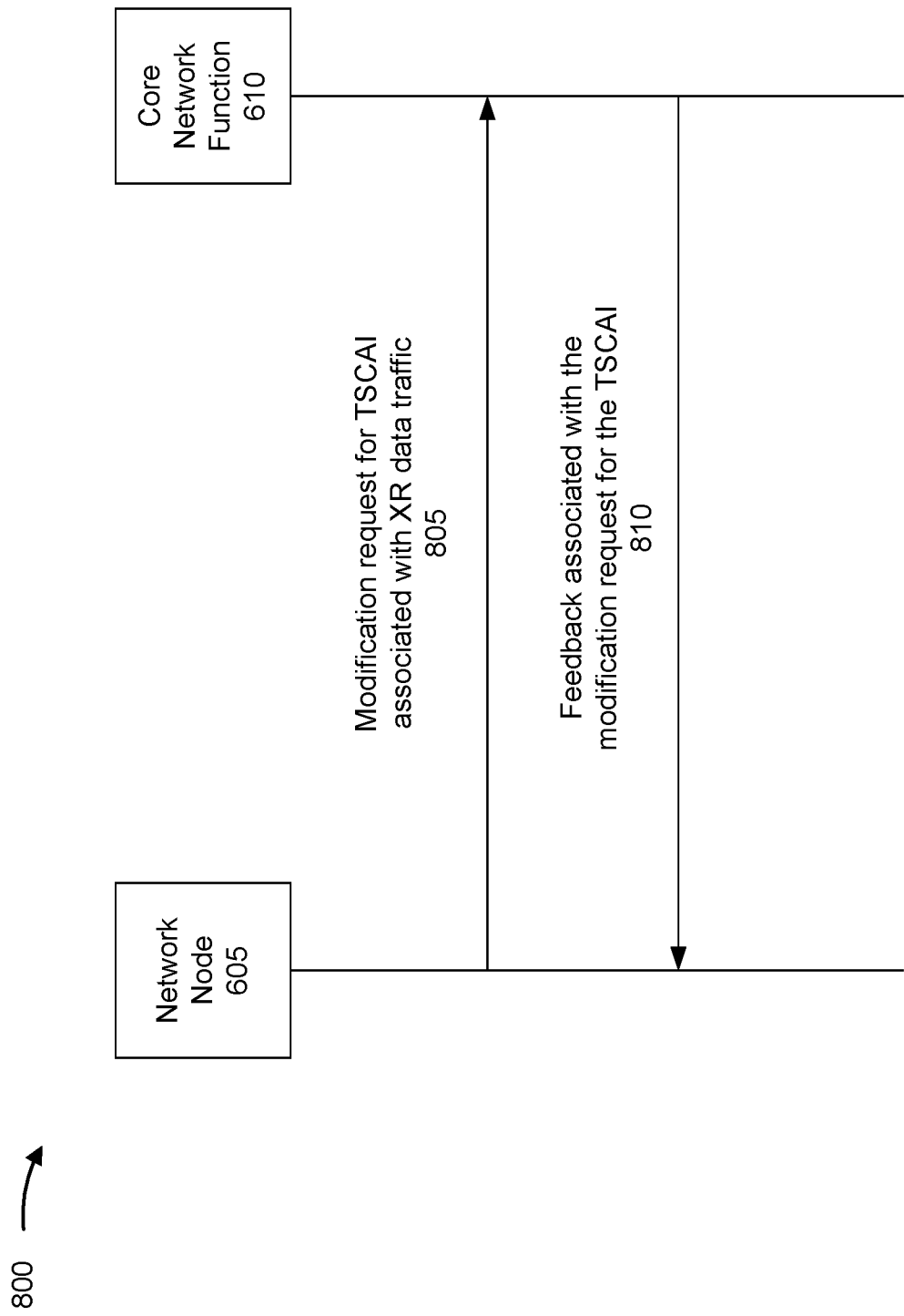
FIG. 8 is a diagram illustrating an example associated with communicating a TSCAI modification request for XR data traffic, in accordance with the present disclosure.

FIG. 8 is a diagram illustrating an example 800 of communicating a TSCAI modification request for XR data traffic, in accordance with the present disclosure.

In some aspects, the core network function 610 may transmit, and the network node 605 may receive, TSCAI associated with XR data traffic. Additional details regarding these features are described above in connection with FIG. 7.

As shown in connection with reference number 805, the network node 605 may transmit, and the core network function 610 may receive, a modification request for the TSCAI associated with the XR data traffic.

In some aspects, the modification request may be a modification request associated with the network node 605 adjusting an XR data traffic pattern. For example, the modification request may be associated with a burst traffic timing adjustment (e.g., traffic arrival time for UE staggering), a data rate adaptation (e.g., burst traffic size), or a frame rate adaption (e.g., periodicity), among other examples. In some aspects, the network node 605 may update the XR data traffic pattern for various scenarios, including but not limited to a mobility scenario (e.g. an initial setup or handover), multi-user MIMO (MU-MIMO) UE pairing, transmission time overlapping, or inter-cell interference, among other examples.

In some aspects, during a handover procedure, the target cell may be configured to reconstruct the XR data traffic timing. For the MU-MIMO scenario, the network node 605 may determine the XR users of the MU-MIMO pair, and may align the XR data traffic arrival times to schedule them in accordance with the MU-MIMO. In some aspects, if the transmission time increases and overlaps with a communication by the next XR device, the core network function 610 may reduce the data rate or otherwise mitigate the traffic arrival time of the next XR user. In some aspects, if inter-cell interference occurs, the network node 605 may mitigate the traffic arrival time of the interfered XR device.

In some aspects, the TSCAI modification request may indicate a requested burst arrival time. As described above, the network node 605 may obtain or determine a best burst traffic arrival time by considering the overall cell resource allocation. In some aspects, the network node 605 may transmit a burst arrival timing adjustment request for the XR data traffic to the core network function 610 (e.g. for UE staggering). In some aspects, the SMF associated with the core network function 610 may reversely translate the relative time from the 5G clock to the external clock time.

In some aspects, the burst arrival time may be an absolute time. For example, the network node 605 may request the absolute time of the XR data traffic. This may be useful for a time-synchronized communication between the core network function 610 and the network node 605. The absolute time may be expressed using a day, second, millisecond, or nanosecond.

In some aspects, the burst arrival time may be a relative shift time. The network node 605 may request the offset time of the XR data traffic from the core network function 610.

This may be useful for non-time-synchronized communications between the core network function 610 and the network node 605. The relative shift time may be expressed in terms of milliseconds or nanoseconds.

In some aspects, the burst arrival time may be a relative offset time compared to another XR data traffic flow. The network node 605 may request the relative timing offset compared to the other XR data traffic flow from the core network function 610. In this example, the burst arrival time may include a flow identifier that indicates a PDU session identifier or a QoS flow identifier. The relative offset time may be expressed in milliseconds or nanoseconds.

In some aspects, the TSCAI modification request may include a request for a traffic size. In some aspects, the traffic size may be adapted according to a channel condition and cell load associated with the XR device. For example, the network node 605 may be configured to determine the best burst traffic size according to the channel condition and cell load associated with the XR device. In some aspects, for a cell-edge XR device, the traffic size may be reduced to meet the PDB requirement and to save radio resources for other XR users. In this example, the network node 605 may request the supportable data size from the core network function 610 (e.g., for data rate adaptation). The traffic size may be expressed in terms of kilobytes.

In some aspects, the TSCAI modification request may include a request for a traffic periodicity. In some aspects, the network node 605 may be configured to determine an appropriate multimedia cadence based at least in part on considering the overall cell resource allocation. For example, the multimedia cadence may be aligned within a common radio resource so as not to conflict with the resources between different multimedia cadences. In another example, the multimedia cadence may be reduced during a handover procedure to minimize the impact of data interruption. In some aspects, the network node 605 may request the supportable periodicity from the core network function 610 (e.g., for frame rate adaptation). For example, the network node 605 may request the multimedia cadence information. Additionally, or alternatively, the network node 605 may request the additional periodicity that is indicated as the rational number.

As shown in connection with reference number 810, the core network function 610 may transmit, and the network node 605 may receive, feedback associated with the TSCAI modification request for the XR data traffic.

In some aspects, after receiving the TSCAI modification request for the XR data traffic, the core network function 610 may send the feedback message to the network node 605. If the TSCAI modification request for the XR data traffic is acceptable, the core network function 610 may report an acknowledge massage to the network node 605. If the TSCAI modification request for the XR data traffic is not acceptable, the core network function 610 may report a failure massage to the network node 605.

As described above, the information currently being transmitted in the TSCAI, such as the flow direction information, periodicity information, and burst arrival time information, may not be compatible with the XR data traffic. Similarly, there is currently no message that is capable of requesting a modification to the XR data traffic pattern indicated in the TSCAI. Using the techniques and apparatuses described herein, the network node 605 may transmit TSCAI that includes information for XR data traffic. This may enable the network node 605 to request information associated with the XR data traffic in advance of the XR data being communicated, and to update radio resources for the data traffic accordingly.

As indicated above, FIG. 8 is provided as an example. Other examples may differ from what is described with regard to FIG. 8.

Figure 9A:
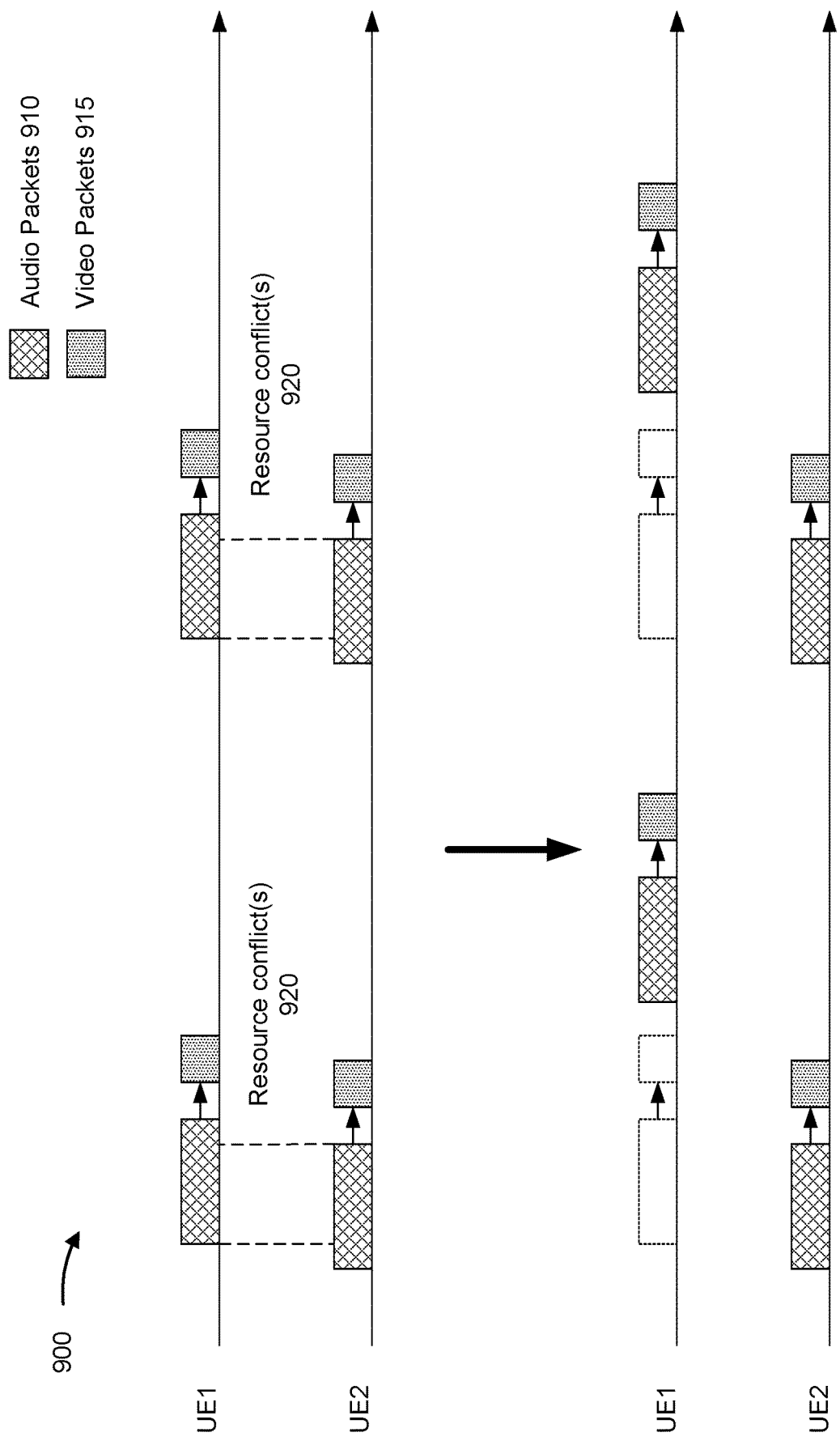
FIGS. 9A-9B are diagrams illustrating examples associated with a relative timing offset indicated in TSCAI, in accordance with the present disclosure.
Figure 9B:
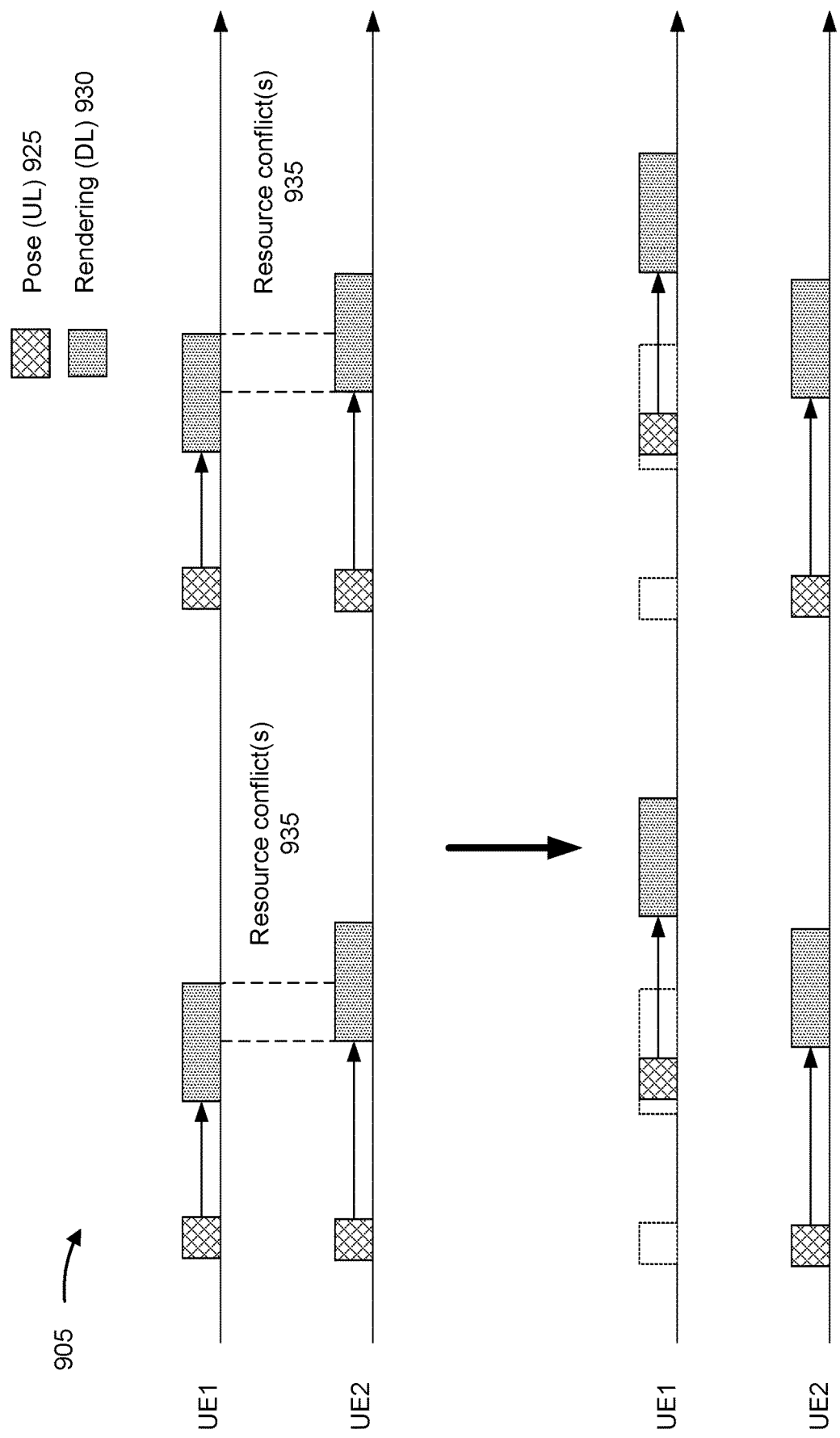

FIGS. 9A and 9B are diagrams illustrating examples of relative timing offset indicated in TSCAI, in accordance with the present disclosure.

In some aspects, as described above in connection with FIG. 7, the TSCAI may indicate a relative timing offset for an XR data traffic flow compared to another XR data traffic flow. In this case, some XR data traffic flows may be aligned by having specific offsets to other XR data traffic data flows. For example, audio and video packets may be shifted by the same amount for synchronization. Additionally, or alternatively, the optimal uplink pose traffic timing may be related to the downlink rendering traffic timing. The relative timing offset may be expressed using milliseconds or nanoseconds.

As shown in the example 900, a first UE (UE1) may transmit one or more audio packets 910 and one or more video packets 915. Similarly, a second UE (UE2) may transmit one or more audio packets 910 and one or more video packets 915. The audio and video packets transmitted by the UE1 may overlap in time with the audio and video packets transmitted by the UE2 (as shown by the resource conflict(s) 920). The TSCAI may indicate a timing offset for the transmissions by the UE1 such that the audio and video packets transmitted by the UE1 do not overlap with the audio and video packets transmitted by the UE2. For example, the one or more audio packets 910 and the one or more video packets 915 transmitted by the UE1 may be shifted in time, in accordance with the timing offset indicated in the TSCAI, so that they do not overlap with the one or more audio packets 910 and the one or more video packets 915 transmitted by the UE2.

As shown in the example 905 in FIG. 9B, pose information 925 transmitted by the UE1 may overlap in time with pose information 925 transmitted by the UE2. Similarly, rendering information received by the UE1 may overlap in time with rendering information received by the UE2 (as shown by the resource conflict(s) 935). The TSCAI may indicate a timing offset for the communications by the UE1 such that the pose information and rendering information associated with the UE1 do not overlap with the pose information and rendering information associated with the UE2. For example, the pose information 925 and the rendering information 930 associated with the UE1 may be shifted in time, in accordance with the timing offset indicated in the TSCAI, so that they do not overlap with the pose information 925 and the rendering information 930 associated with the UE2.

As indicated above, FIGS. 9A and 9B are provided as examples. Other examples may differ from what is described with regard to FIGS. 9A and 9B.

Figure 10:
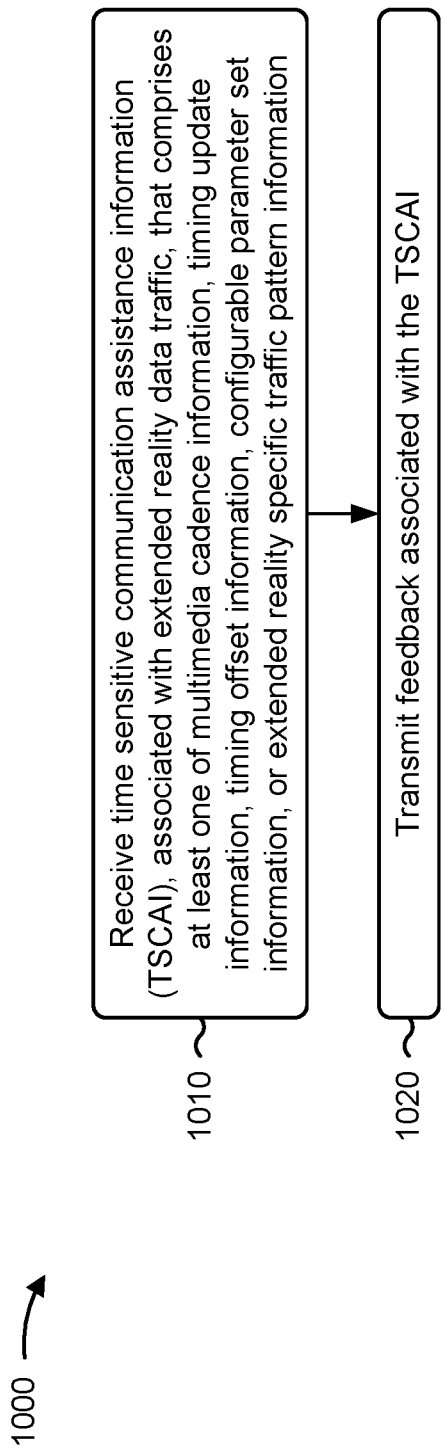
FIG. 10 is a diagram illustrating an example process associated with communicating TSCAI for XR data traffic, in accordance with the present disclosure.

FIG. 10 is a diagram illustrating an example process 1000 performed, for example, by a network node, in accordance with the present disclosure. Example process 1000 is an example where the network node (e.g., network node 605) performs operations associated with communicating TSCAI for XR data traffic.

As shown in FIG. 10, in some aspects, process 1000 may include receiving TSCAI, associated with extended reality data traffic, that comprises at least one of multimedia cadence information, timing update information, timing offset information, configurable parameter set information, or extended reality specific traffic pattern information (block 1010). For example, the network node (e.g., using communication manager 150 and/or reception component 1202, depicted in FIG. 12) may receive TSCAI, associated with extended reality data traffic, that comprises at least one of multimedia cadence information, timing update information, timing offset information, configurable parameter set information, or extended reality specific traffic pattern information, as described above.

As further shown in FIG. 10, in some aspects, process 1000 may include transmitting feedback associated with the TSCAI (block 1020). For example, the network node (e.g., using communication manager 150 and/or transmission component 1204, depicted in FIG. 12) may transmit feedback associated with the TSCAI, as described above.

Process 1000 may include additional aspects, such as any single aspect or any combination of aspects described below and/or in connection with one or more other processes described elsewhere herein.

In a first aspect, the multimedia cadence information comprises an explicit multimedia cadence value or a rational number associated with a multimedia periodicity.

In a second aspect, alone or in combination with the first aspect, the TSCAI further comprises nominal burst arrival time information that indicates a center of a burst arrival time distribution of the extended reality data traffic.

In a third aspect, alone or in combination with one or more of the first and second aspects, the timing offset information indicates a timing offset for an extended reality data traffic flow relative to another extended reality data traffic flow, or a timing offset for a quality of service flow relative to another quality of service flow.

In a fourth aspect, alone or in combination with one or more of the first through third aspects, the timing offset information indicates a set of extended reality data traffic flows and an offset associated with each of the extended reality data traffic flows.

In a fifth aspect, alone or in combination with one or more of the first through fourth aspects, the extended reality specific traffic pattern information indicates a jitter associated with a burst arrival time of the extended reality data traffic.

In a sixth aspect, alone or in combination with one or more of the first through fifth aspects, the extended reality specific traffic pattern information indicates a nominal packet delay budget which corresponds to the packet delay budget associated with the nominal burst arrival time.

In a seventh aspect, alone or in combination with one or more of the first through sixth aspects, the extended reality specific traffic pattern information indicates an average burst traffic size associated with the extended reality data traffic.

In an eighth aspect, alone or in combination with one or more of the first through seventh aspects, the extended reality specific traffic pattern information indicates a variance of a burst traffic size associated with the extended reality data traffic.

In a ninth aspect, alone or in combination with one or more of the first through eighth aspects, the update timing information indicates a time at which an updated burst traffic pattern is to be applied.

In a tenth aspect, alone or in combination with one or more of the first through ninth aspects, the update timing information corresponds to an index of the updated burst traffic pattern, or a relative offset number of burst traffic patterns.

In an eleventh aspect, alone or in combination with one or more of the first through tenth aspects, the extended reality specific traffic pattern information indicates a type of data traffic associated with the extended reality data traffic.

In a twelfth aspect, alone or in combination with one or more of the first through eleventh aspects, the configurable parameter set information comprises a multimedia cadence configurable parameter set or a burst traffic size configurable parameter set.

In a thirteenth aspect, alone or in combination with one or more of the first through twelfth aspects, the TSCAI indicates whether the feedback is requested from the network node.

In a fourteenth aspect, alone or in combination with one or more of the first through thirteenth aspects, the feedback comprises an acknowledgement indication or a failure indication.

In a fifteenth aspect, alone or in combination with one or more of the first through fourteenth aspects, receiving the TSCAI comprises receiving the TSCAI from a core network, and transmitting the feedback comprises transmitting the feedback to the core network.

In a sixteenth aspect, alone or in combination with one or more of the first through fifteenth aspects, the extended reality data traffic comprises virtual reality data traffic, augmented reality data traffic, or mixed reality data traffic.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
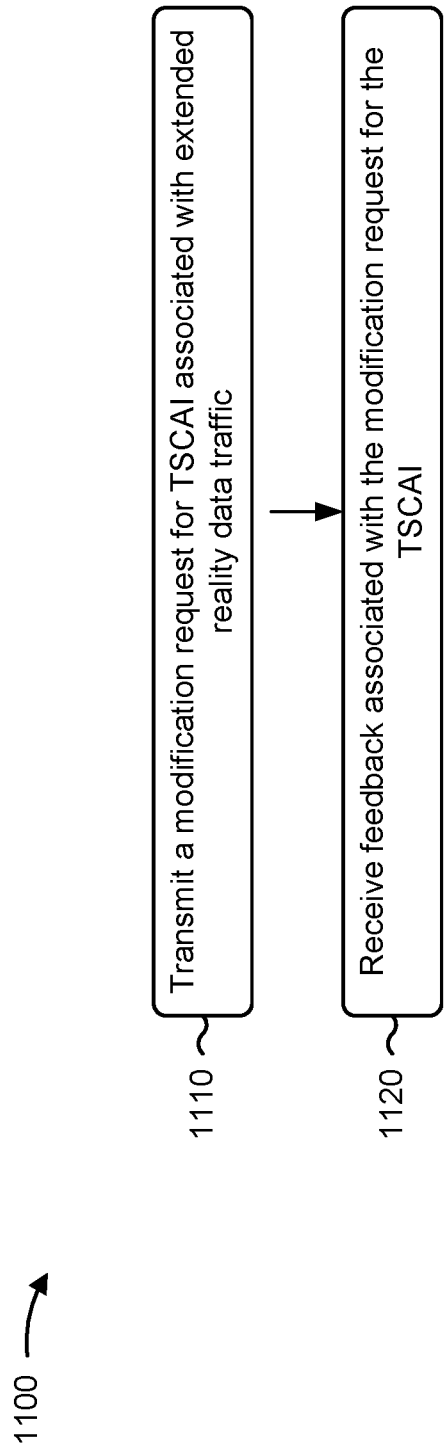
FIG. 11 is a diagram illustrating an example process associated with communicating a TSCAI modification request for XR data traffic, in accordance with the present disclosure.

FIG. 11 is a diagram illustrating an example process 1100 performed, for example, by a network node, in accordance with the present disclosure. Example process 1100 is an example where the network node (e.g., network node 605) performs operations associated with communicating a TSCAI modification request for XR data traffic.

As shown in FIG. 11, in some aspects, process 1100 may include transmitting a modification request for TSCAI associated with extended reality data traffic (block 1110). For example, the network node (e.g., using communication manager 150 and/or transmission component 1204, depicted in FIG. 12) may transmit a modification request for TSCAI associated with extended reality data traffic, as described above.

As further shown in FIG. 11, in some aspects, process 1100 may include receiving feedback associated with the modification request for the TSCAI (block 1120). For example, the network node (e.g., using communication manager 150 and/or reception component 1202, depicted in FIG. 12) may receive feedback associated with the modification request for the TSCAI, as described above.

Process 1100 may include additional aspects, such as any single aspect or any combination of aspects described below and/or in connection with one or more other processes described elsewhere herein.

In a first aspect, the modification request comprises a burst arrival timing adjustment request for the extended reality data traffic.

In a second aspect, alone or in combination with the first aspect, the burst arrival timing adjustment request comprises a request for an absolute time associated with the extended reality data traffic or a timing offset associated with the extended reality data traffic flow or a quality of service flow.

In a third aspect, alone or in combination with one or more of the first and second aspects, the modification request comprises a request for a data size that is supported by the network node.

In a fourth aspect, alone or in combination with one or more of the first through third aspects, the modification request comprises a request for a multimedia cadence that is supported by the network node.

In a fifth aspect, alone or in combination with one or more of the first through fourth aspects, the feedback comprises an acknowledgement indication or a failure indication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
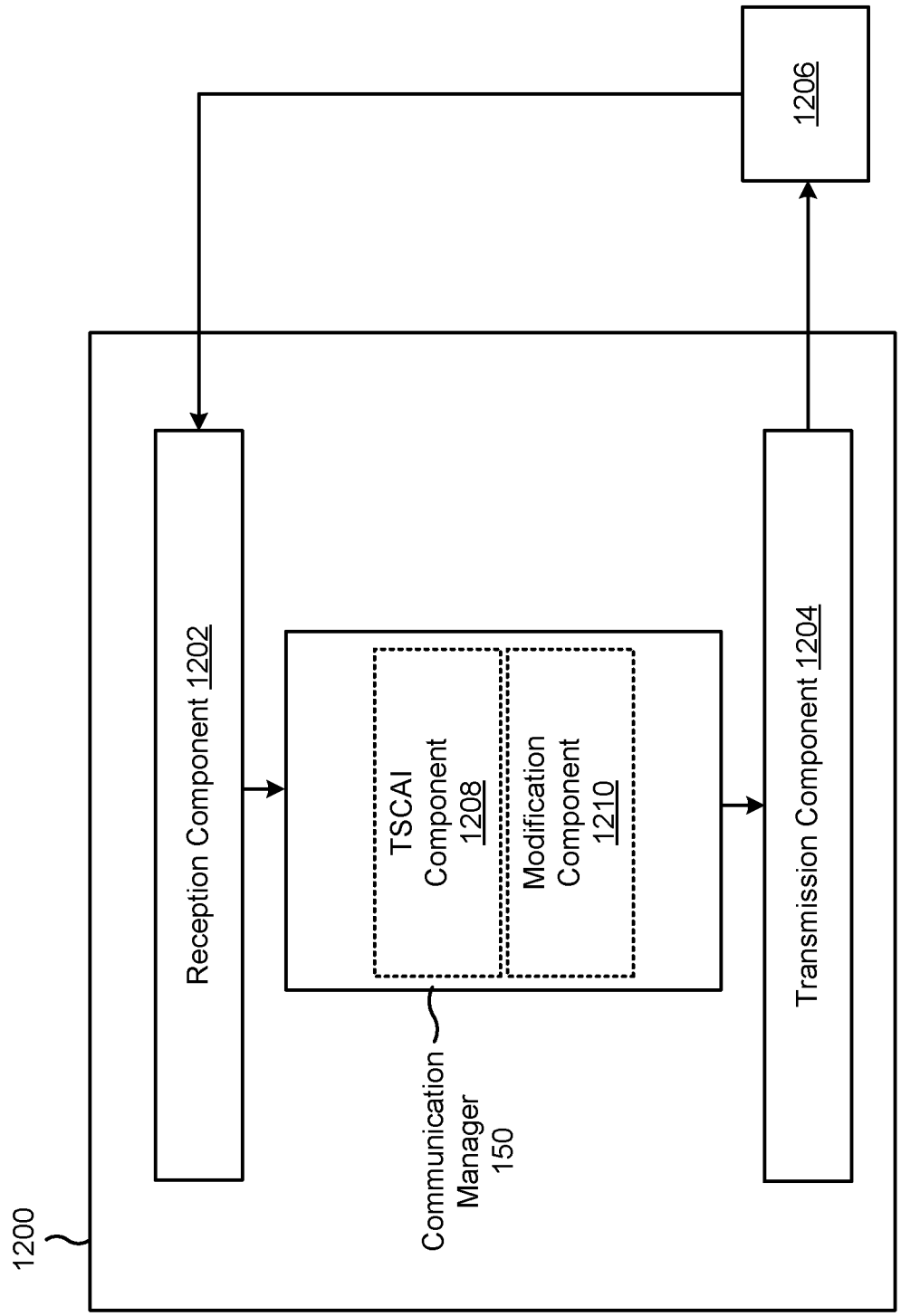
FIG. 12 is a diagram of an example apparatus for wireless communication, in accordance with the present disclosure.

FIG. 12 is a diagram of an example apparatus 1200 for wireless communication. The apparatus 1200 may be a network node, or a network node may include the apparatus 1200. As described herein, the network node (such as the network node 605) may include some or all of the features of the base station 110. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include one or more of a TSCAI component 1208 or a modification component 1210, among other examples.

In some aspects, the apparatus 1200 may be configured to perform one or more operations described herein in connection with FIGS. 7, 8, 9A, and 9B. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the network node described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the network node described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the network node described in connection with FIG. 2. In some aspects, the transmission component 1204 may be co-located with the reception component 1202 in a transceiver.

The reception component 1202 and/or the TSCAI component 1208 may receive TSCAI, associated with extended reality data traffic, that comprises at least one of multimedia cadence information, timing update information, timing offset information, configurable parameter set information, or extended reality specific traffic pattern information. The transmission component 1204 may transmit feedback associated with the TSCAI.

The transmission component 1204 and/or the modification component 1210 may transmit a modification request for TSCAI associated with extended reality data traffic. The reception component 1202 may receive feedback associated with the modification request for the TSCAI.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a network node, comprising: receiving time sensitive communication assistance information (TSCAI), associated with extended reality data traffic, that comprises at least one of multimedia cadence information, timing update information, timing offset information, configurable parameter set information, or extended reality specific traffic pattern information; and transmitting feedback associated with the TSCAI.

Aspect 2: The method of Aspect 1, wherein the multimedia cadence information comprises an explicit multimedia cadence value or a rational number associated with a multimedia periodicity.

Aspect 3: The method of Aspect 2, wherein the multimedia cadence information is capable of being used to configure a discontinuous reception cycle or a periodicity of a semi-persistent scheduling or configured grant communication scheme at the network node.

Aspect 4: The method of any of Aspects 1-3, wherein the TSCAI further comprises nominal burst arrival time information that indicates a center of a burst arrival time distribution of the extended reality data traffic.

Aspect 5: The method of Aspect 3, wherein the nominal burst arrival time information is capable of being used to configure a discontinuous reception cycle or a periodicity of a semi-persistent scheduling or configured grant communication scheme at the network node.

Aspect 6: The method of Aspect 3, further comprising receiving, from the core network function, an updated burst arrival time based at least in part on a time difference between the core network function and the network node being drafted by more than a threshold.

Aspect 7: The method of any of Aspects 1-6, wherein the timing offset information indicates a timing offset for an extended reality data traffic flow relative to another extended reality data traffic flow, or a timing offset for a quality of service flow relative to another quality of service flow.

Aspect 8: The method of any of Aspects 1-7, wherein the timing offset information indicates a set of extended reality data traffic flows and an offset associated with each of the extended reality data traffic flows.

Aspect 9: The method of any of Aspects 1-8, wherein the extended reality specific traffic pattern information indicates a jitter associated with a burst arrival time of the extended reality data traffic.

Aspect 10: The method of any of Aspects 1-9, wherein the extended reality specific traffic pattern information indicates a nominal packet delay budget which corresponds to a packet delay budget associated with a nominal burst arrival time.

Aspect 11: The method of any of Aspects 1-10, wherein the extended reality specific traffic pattern information indicates an average burst traffic size associated with the extended reality data traffic.

Aspect 12: The method of any of Aspects 1-11, wherein the extended reality specific traffic pattern information indicates a variance of a burst traffic size associated with the extended reality data traffic.

Aspect 13: The method of any of Aspects 1-12, wherein the update timing information indicates a time at which an updated burst traffic pattern is to be applied.

Aspect 14: The method of Aspect 13, wherein the update timing information corresponds to an index of the updated burst traffic pattern, or a relative offset number of burst traffic patterns.

Aspect 15: The method of any of Aspects 1-14, wherein the extended reality specific traffic pattern information indicates a type of data traffic associated with the extended reality data traffic.

Aspect 16: The method of any of Aspects 1-15, wherein the configurable parameter set information comprises a multimedia cadence configurable parameter set or a burst traffic size configurable parameter set.

Aspect 17: The method of any of Aspects 1-16, wherein the TSCAI indicates whether the feedback is requested from the network node.

Aspect 18: The method of any of Aspects 1-17, wherein the feedback comprises an acknowledgement indication or a failure indication.

Aspect 19: The method of any of Aspects 1-18, wherein receiving the TSCAI comprises receiving the TSCAI from a core network, and wherein transmitting the feedback comprises transmitting the feedback to the core network.

Aspect 20: The method of any of Aspects 1-19, wherein the extended reality data traffic comprises virtual reality data traffic, augmented reality data traffic, or mixed reality data traffic.

Aspect 21: A method of wireless communication performed by a network node, comprising: transmitting a modification request for time sensitive communication assistance information (TSCAI) associated with extended reality data traffic; and receiving feedback associated with the modification request for the TSCAI.

Aspect 22: The method of Aspect 21, wherein the modification request comprises a burst arrival timing adjustment request for the extended reality data traffic.

Aspect 23: The method of Aspect 22, wherein the burst arrival timing adjustment request comprises a request for an absolute time associated with the extended reality data traffic or a timing offset associated with the extended reality data traffic flow or a quality of service flow.

Aspect 24: The method of any of Aspects 21-23, wherein the modification request comprises a request for a data size that is supported by the network node.

Aspect 25: The method of any of Aspects 21-24, wherein the modification request comprises a request for a multimedia cadence that is supported by the network node.

Aspect 26: The method of any of Aspects 21-25, wherein the feedback comprises an acknowledgement indication or a failure indication.

Aspect 27: An apparatus for wireless communication at a device, comprising a processor; memory coupled with the processor; and instructions stored in the memory and executable by the processor to cause the apparatus to perform the method of one or more of Aspects 1-20.

Aspect 28: A device for wireless communication, comprising a memory and one or more processors coupled to the memory, the one or more processors configured to perform the method of one or more of Aspects 1-20.

Aspect 29: An apparatus for wireless communication, comprising at least one means for performing the method of one or more of Aspects 1-20.

Aspect 30: A non-transitory computer-readable medium storing code for wireless communication, the code comprising instructions executable by a processor to perform the method of one or more of Aspects 1-20.

Aspect 31: A non-transitory computer-readable medium storing a set of instructions for wireless communication, the set of instructions comprising one or more instructions that, when executed by one or more processors of a device, cause the device to perform the method of one or more of Aspects 1-20.

Aspect 32: An apparatus for wireless communication at a device, comprising a processor; memory coupled with the processor; and instructions stored in the memory and executable by the processor to cause the apparatus to perform the method of one or more of Aspects 21-26.

Aspect 33: A device for wireless communication, comprising a memory and one or more processors coupled to the memory, the one or more processors configured to perform the method of one or more of Aspects 21-26.

Aspect 34: An apparatus for wireless communication, comprising at least one means for performing the method of one or more of Aspects 21-26.

Aspect 35: A non-transitory computer-readable medium storing code for wireless communication, the code comprising instructions executable by a processor to perform the method of one or more of Aspects 21-26.

Aspect 36: A non-transitory computer-readable medium storing a set of instructions for wireless communication, the set of instructions comprising one or more instructions that, when executed by one or more processors of a device, cause the device to perform the method of one or more of Aspects 21-26.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a network node, comprising:
   receiving, from a core network function, time sensitive communication assistance information (TSCAI), associated with extended reality data traffic, that comprises:
      multimedia cadence information comprising a multimedia cadence measured in frames per second (fps) or Hertz (Hz); and
      extended reality specific traffic pattern information that indicates, in advance of an extended reality data traffic communication, a jitter associated with a burst arrival time of the extended reality data traffic; and
   transmitting feedback associated with the TSCAI, wherein the feedback comprises an acknowledgement indication that the TSCAI is acceptable.

2. The method of claim 1, wherein the multimedia cadence information comprises a rational number associated with the multimedia cadence.

3. The method of claim 1, wherein the TSCAI further comprises nominal burst arrival time information that indicates a center of a burst arrival time distribution of the extended reality data traffic.

4. The method of claim 1, wherein the TSCAI further comprises timing offset information that indicates a timing offset for an extended reality data traffic flow relative to another extended reality data traffic flow, or a timing offset for a quality of service flow relative to another quality of service flow.

5. The method of claim 1, wherein the TSCAI further comprises timing offset information that indicates a set of extended reality data traffic flows and an offset associated with each of the extended reality data traffic flows.

6. The method of claim 1, wherein the extended reality specific traffic pattern information further indicates a nominal packet delay budget which corresponds to a packet delay budget associated with a nominal burst arrival time.

7. The method of claim 1, wherein the extended reality specific traffic pattern information further indicates an average burst traffic size associated with the extended reality data traffic.

8. The method of claim 1, wherein the TSCAI further comprises configurable parameter set information that comprises a multimedia cadence configurable parameter set or a burst traffic size configurable parameter set.

9. The method of claim 1, wherein the TSCAI indicates whether the feedback is requested from the network node.

10. A method of wireless communication performed by a network node, comprising:
    transmitting a modification request for time sensitive communication assistance information (TSCAI) associated with extended reality data traffic, the modification request comprising:
       a request for a multimedia cadence that is supported by the network node and is based at least in part on a cell resource allocation, the multimedia cadence being measured in frames per second (fps) or Hertz (Hz); and
       a burst arrival timing adjustment request for user equipment (UE) staggering; and receiving feedback associated with the modification request for the TSCAI, wherein the feedback comprises an acknowledgement indication that the modification request is acceptable.

11. The method of claim 10, wherein the burst arrival timing adjustment request comprises a request for a timing offset associated with the extended reality data traffic or a quality of service flow.

12. The method of claim 10, wherein the burst arrival timing adjustment request comprises a request for an absolute time associated with the extended reality data traffic.

13. The method of claim 10, wherein the modification request further comprises a request for a data size that is supported by the network node or a multimedia cadence that is supported by the network node.

14. An apparatus for wireless communication at a network node, comprising:
one or more memories; and
one or more processors, coupled to the one or more memories, configured to:
receive, from a core network function, time sensitive communication assistance information (TSCAI), associated with extended reality data traffic, that comprises:
multimedia cadence information comprising a multimedia cadence measured in frames per second (fps) or Hertz (Hz); and
extended reality specific traffic pattern information that indicates, in advance of an extended reality data traffic communication, a jitter associated with a burst arrival time of the extended reality data traffic; and
transmit feedback associated with the TSCAI, wherein the feedback comprises an acknowledgement indication that the TSCAI is acceptable.

15. The apparatus of claim 14, wherein the multimedia cadence information comprises a rational number associated with the multimedia cadence.

16. The apparatus of claim 14, wherein the TSCAI further comprises nominal burst arrival time information that indicates a center of a burst arrival time distribution of the extended reality data traffic.

17. The apparatus of claim 14, wherein the TSCAI further comprises timing offset information that indicates a timing offset for an extended reality data traffic flow relative to another extended reality data traffic flow, or a timing offset for a quality of service flow relative to another quality of service flow.

18. The apparatus of claim 14, wherein the TSCAI further comprises timing offset information that indicates a set of extended reality data traffic flows and an offset associated with each of the extended reality data traffic flows.

19. The apparatus of claim 14, wherein the extended reality specific traffic pattern information further indicates a nominal packet delay budget which corresponds to a packet delay budget associated with a nominal burst arrival time.

20. The apparatus of claim 14, wherein the extended reality specific traffic pattern information further indicates an average burst traffic size associated with the extended reality data traffic.

21. The apparatus of claim 14, wherein the extended reality specific traffic pattern information further indicates a variance of a burst traffic size associated with the extended reality data traffic.

22. The apparatus of claim 14, wherein the TSCAI further comprises timing update information that indicates a time at which an updated burst traffic pattern is to be applied.

23. The apparatus of claim 22, wherein the timing update information corresponds to an index of the updated burst traffic pattern, or a relative offset number of burst traffic patterns.

24. The apparatus of claim 14, wherein the extended reality specific traffic pattern information further indicates a type of data traffic associated with the extended reality data traffic.

25. The apparatus of claim 14, wherein the TSCAI further comprises configurable parameter set information that comprises a multimedia cadence configurable parameter set or a burst traffic size configurable parameter set.

26. The apparatus of claim 14, wherein the TSCAI indicates whether the feedback is requested from the network node.

27. An apparatus for wireless communication at a network node, comprising:
one or more memories; and
one or more processors, coupled to the one or more memories, configured to:
transmit a modification request for time sensitive communication assistance information (TSCAI) associated with extended reality data traffic, the modification request comprising:
a request for a multimedia cadence that is supported by the network node and is based at least in part on a cell resource allocation, the multimedia cadence being measured in frames per second (fps) or Hertz (Hz); and
a burst arrival timing adjustment request for user equipment (UE) staggering; and
receive feedback associated with the modification request for the TSCAI, wherein the feedback comprises an acknowledgement indication that the modification request is acceptable.

28. The apparatus of claim 27, wherein the burst arrival timing adjustment request comprises a request for a timing offset associated with the extended reality data traffic or a quality of service flow.

29. The apparatus of claim 27, wherein the burst arrival timing adjustment request comprises a request for an absolute time associated with the extended reality data traffic.

30. The apparatus of claim 27, wherein the modification request further comprises a request for a data size that is supported by the network node.

* * * * *